(12) United States Patent
Ichitani

(10) Patent No.: US 7,679,780 B2
(45) Date of Patent: Mar. 16, 2010

(54) METHOD OF PRODUCING A COLOR CONVERSION TABLE, IMAGE PROCESSING APPARATUS, METHOD OF IMAGE PROCESSING, IMAGE FORMING APPARATUS AND RECORDING MEDIA

(75) Inventor: Shuji Ichitani, Hachioji (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 1150 days.

(21) Appl. No.: 11/285,532

(22) Filed: Nov. 21, 2005

(65) Prior Publication Data

US 2007/0035753 A1 Feb. 15, 2007

(30) Foreign Application Priority Data

Aug. 10, 2005 (JP) ............................. 2005-232515

(51) Int. Cl.
*G06K 15/02* (2006.01)
(52) U.S. Cl. .............. 358/1.9; 358/3.01; 358/3.23; 358/520; 382/167; 382/274; 382/275; 345/600; 345/606; 348/448; 399/49; 399/56
(58) Field of Classification Search .............. 358/1.9, 358/2.1, 3.23, 1.15, 523, 505, 508, 515, 518, 358/520, 525, 537, 448, 452, 465, 475; 382/167, 382/274, 275, 300; 348/448; 399/49, 58, 399/60, 72; 345/600–604, 606–610
See application file for complete search history.

(56) References Cited

U.S. PATENT DOCUMENTS

| | | | | |
|---|---|---|---|---|
| 4,632,585 A | * | 12/1986 | Oyamatsu et al. | 400/613 |
| 4,819,193 A | * | 4/1989 | Imao | 358/521 |
| 4,949,184 A | * | 8/1990 | Suzuki | 358/300 |
| 5,446,543 A | * | 8/1995 | Nakagawa et al. | 356/405 |
| 5,483,358 A | * | 1/1996 | Sugiura et al. | 358/508 |
| 5,724,442 A | * | 3/1998 | Ogatsu et al. | 382/167 |
| 6,042,211 A | * | 3/2000 | Hudson et al. | 347/15 |
| 6,115,561 A | * | 9/2000 | Fukushima | 399/49 |
| 6,178,007 B1 | * | 1/2001 | Harrington | 358/1.9 |
| 6,292,195 B1 | * | 9/2001 | Shimizu et al. | 345/604 |
| 6,323,969 B1 | * | 11/2001 | Shimizu et al. | 358/523 |

(Continued)

FOREIGN PATENT DOCUMENTS

JP 7-236069 A 9/1995

(Continued)

OTHER PUBLICATIONS

Japanese Office Action dated Jan. 29, 2008, issued in counterpart Japanese Patent Application No. 2005-264096.

*Primary Examiner*—Negussie Worku
(74) *Attorney, Agent, or Firm*—Frishauf, Holtz, Goodman & Chick, P.C.

(57) ABSTRACT

A method for producing a color conversion table by which a color image signal to be handled in an image input system is converted to a N bit color image signal to be handled in an image output system, comprising the step of producing a color conversion table from which a N+α bit color output value, exceeding a color gamut of the color image signal to be handled in the image output system can be read out corresponding to a color input value of the color image signal to be handled in the input system.

21 Claims, 16 Drawing Sheets

U.S. PATENT DOCUMENTS

| | | | |
|---|---|---|---|
| 6,724,500 B1 * | 4/2004 | Hains et al. | 358/1.9 |
| 7,190,485 B2 * | 3/2007 | Couwenhoven et al. | 358/1.9 |
| 7,227,559 B2 * | 6/2007 | Aoki et al. | 345/690 |
| 7,271,935 B2 * | 9/2007 | Coons et al. | 358/2.1 |
| 2004/0061881 A1 * | 4/2004 | Shimizu et al. | 358/1.9 |
| 2004/0239969 A1 * | 12/2004 | Shoda et al. | 358/1.9 |
| 2005/0018903 A1 * | 1/2005 | Miyagi et al. | 382/167 |
| 2005/0094169 A1 * | 5/2005 | Berns et al. | 358/1.9 |
| 2006/0028665 A1 * | 2/2006 | Kawai | 358/1.9 |
| 2009/0060326 A1 * | 3/2009 | Imai et al. | 382/167 |

FOREIGN PATENT DOCUMENTS

JP 2002-094826 A 3/2002

\* cited by examiner

FIG. 4

| LATTICE POINT | RGB VALUES | | | INPUT LAB VALUE TO BE OBTAINED | | | CORRESPONDING CMYK VALUE | | | |
|---|---|---|---|---|---|---|---|---|---|---|
| | R | G | B | L* | a* | b* | C | M | Y | K |
| a | 255 | 255 | 221 | 80 | 0 | 80 | 0 | 0 | 180 | 0 |
| b | 255 | 255 | 238 | 75 | 0 | 90 | 0 | 0 | 200 | 0 |
| c | 238 | 238 | 221 | 70 | 0 | 75 | -10 | -10 | 170 | 0 |
| d | 238 | 238 | 238 | 65 | 0 | 85 | -10 | -10 | 190 | 0 |
| e | 245 | 245 | 230 | | | | 0 | 0 | 185 | 0 |
| f | 21 | 21 | 36 | 50 | 0 | -4 | 120 | 120 | 80 | 30 |
| g | 21 | 21 | 30 | 48 | 0 | -1 | 120 | 120 | 100 | 32 |
| h | 12 | 12 | 36 | 41 | 0 | -10 | 140 | 140 | 80 | 39 |
| i | 12 | 12 | 30 | 39 | 0 | -7 | 140 | 140 | 100 | 41 |
| j | 18 | 18 | 32 | | | | 124 | 124 | 185 | 34 |

INTERPOLATION AT a, b, c, AND d

RESULT OF APPLYING THE COLOR CONVERSION INTERPOLATOR

INTERPOLATION AT f, g, h, AND i

RESULT OF APPLYING THE COLOR CONVERSION INTERPOLATOR

METHOD OF PRODUCING A COLOR CONVERSION TABLE, IMAGE PROCESSING APPARATUS, METHOD OF IMAGE PROCESSING, IMAGE FORMING APPARATUS AND RECORDING MEDIA

This application is based on Japanese Patent Application No. 2005-232515 filed on Aug. 10, 2005, in. Japanese Patent Office, the entire content of which is hereby incorporated by reference.

BACKGROUND OF THE INVENTION

1. Field of the Invention

The present invention relates to a method of producing a color conversion table for color conversion from the color image signal to be handled in an input system into a color image signal to be handled in an output system, image processing apparatus, method of image processing, image forming apparatus and recording media.

2. Description of Related Art

In recent years, a color printer, color copying machine and combination machine thereof have come into frequent use. In many cases, the color image forming apparatus used in these machines incorporates a 3D color information conversion table (3D Lookup Table; also called the RGB→4 CMYK3D-LUT in the following description) for color conversion from the image information of red (R), green (G) and blue (B) in a signal processing system into the image data of a CMYK signal processing system. This is because the image forming apparatus adopts the structure wherein the operation is performed according to the image data of the CMYK signal processing system.

The RGB→CMYK3D-LUT is created by matrix processing or interpolation arithmetic processing according to the color measurement value of $n^3$ patch documents (XYZ or LAB) wherein patches are arranged so as to increase the intensity of each of the RGB colors, and the scanner signal (RGB). Then the RGB→CMYK3D-LUT is used to convert the RGB signal into the XYZ output signal or Lab output signal.

The Patent Document 1 discloses an image processing apparatus related to the image forming apparatus handling the aforementioned color image data. This image processing apparatus applies processing of color gamut compression to the color reproduction area of an output device for the image data inputted from an input device. The image data subjected to color gamut compression is outputted to the output device.

FIGS. 17A and 17B show the color coordinate system representing an example of the CMY→Lab3D-LUT and RGB→Lab3D-LUT in the conventional Lab color coordinate system.

The vertical axis in FIG. 17A represents a brightness L* axis, and the horizontal axis denotes a chromaticity b* axis. Chromaticity a* axis is found at the intersection between the brightness L* axis and chromaticity b* axis. In FIG. 17A, the first lattice pattern I corresponds to the RGB→Lab3D-LUT H wherein the color image signals R, G and B of the RGB signal processing system is represented in 256 gradations. The contour line of the lattice pattern I shows the color gamut boundary that can be handled by the RGB signal processing system.

In this example, the lattice pattern. II displayed so as to be included in the lattice pattern I corresponds-to the CMY→Lab3D-LUT wherein the color image signals C, M, Y and K handled by the CMYK signal processing system are expressed in 256 gradations. The contour line of the lattice pattern II shows the color gamut boundary (hereinafter also referred to as "printer color gamut") handled by the CMYK signal processing system. In this displayed example, if that the area inside the printer color gamut is defined as "inside the printer color gamut", and the area outside the printer color gamut as "outside the printer color gamut", a decision step is taken to determine if a target for arithmetic processing is located inside or outside the printer color gamut.

The circle showed in a broken line of FIG. 17B is an enlarged view of the area close to the printer color gamut in FIG. 17A. The RGB→Lab3D-LUT shown in FIG. 17B exhibits the case when the lattice point is located across the printer color gamut. In this example, the lattice points a and b are located outside the printer color gamut. The lattice points c and d are found inside the printer color gamut. This is the case where a non-lattice point (arithmetic processing reference point) e is given in the area enclosed by these four lattice points a, b, c and d and outside the printer color gamut. In this case, in the image processing apparatus disclosed on Patent Document 1, when the input RGB value outside the printer color gamut is subjected to color conversion and interpolation as shown in FIG. 17B, then processing of compression is applied by the output CMYK values of four lattice points a, b, c and d, so that interpolation is carried out inside the printer color gamut.

FIG. 18 is a flowchart representing and example of the conventional RGB→CMYK3D-LUT. In the Step F1 of the flowchart shown in FIG. 18, the input data and Lab data are read out from a predetermined image memory and are displayed on the RAM. The input data and Lab data are displayed on the RAM, so that the RGB→Lab3D-LUT is created.

CMY data is read out from the image memory in the Step F2, and is displayed on the RAM. The CMY data is displayed on the RAM, so that the CMYK→4 Lab4D-LUT is created. Then the system goes to the Step F3 and the CMY→Lab3D-LUT is created from the CMYK→Lab4D-LUT, based on the GCR algorithm.

After that, the system goes to the Step F4 to set the Lab value obtained in the Lab coordinate system. In this case, the CMY value corresponding to each Lab value of the RGB→Lab3D-LUT is calculated from the CMY→Lab3D-LUT. Then the system goes to the Step F5 to search the CMY→Lab3D-LUT to find out the Lab value preset (inputted in advance). A decision step is taken to determine if this Lab value is located inside or outside the color gamut area of the CMY→Lab3D-LUT (color gamut area outside/inside decision step). If it has been determined in this decision step that the target of arithmetic processing $P_{in}$ is located outside the printer color gamut, the system goes to Step F6 where the process of compression is carried out.

If it has been determined in the aforementioned Step F5 that the target of arithmetic processing pin is located inside the printer color gamut, the system goes to Step F7 where CMY value is found out by checking the CMY→Lab3D-LUT using the preset Lab value. The CMY value corresponding to this step of checking is calculated. Then the system goes to Step F8, where a decision step is taken to determine if the process of calculating the CMY value corresponding to the preset (inputted in advance) Lab value has been completed or not. If it has not yet completed, the system goes back to Step F4 and the aforementioned procedure is repeated. Upon completion of calculation of the CMY values for all the Lab values, the RGB→CMYK3D-LUT is created. Then the system goes to Step F9 where the RGB→CMY3D-LUT is converted into the RGB→CMYK3D-LUT by the GCR. This allows the RGB→CMYK3D-LUT to be created.

[Patent Document 1] Official Gazette of Japanese Patent Tokkai 07-236069

The conventional color image forming apparatus has the following problems:

i. In the color image forming apparatus to which the image processing apparatus disclosed in the Patent Document 1 applied, if the scanner color gamut is wider than the printer color gamut and the target of arithmetic processing (point e) is situated outside the printer color gamut, then the point e (the target of arithmetic processing) outside the printer color gamut is compressed inside the printer color gamut, as shown in FIG. 17B. Thus, when the input RGB value outside the printer color gamut has been converted by a color conversion interpolator, it will be inside the printer color gamut.

ii. In this connection, if the target of arithmetic processing outside the printer color gamut is interpolated inside the color gamut boundary, color difference may be further increased close to the color gamut boundary. Thus, effective use of the printer color gamut cannot be achieved in some cases.

iii. If the target of arithmetic processing outside the printer color gamut is interpolated inside the printer color gamut, unwanted colors may be mixed and color image quality may deteriorate due to color mixture.

SUMMARY OF THE INVENTION

In accordance with a first aspect of the present invention, a method for producing a color conversion table by which a predetermined bit color image signal to be handled in an image input system for inputting an image is converted to a N bit color image signal to be handled in an image output system for outputting an image, N being a positive integer, comprising the step of:

producing a color conversion table from which a N+αbit color output value, with α as a positive integer, exceeding a color gamut of the color image signal to be handled in the image output system can be read out corresponding to a color input value of the color image signal to be handled in the input system, the color gamut having gradient values not less than 0 and not more than $2^{N-1}$.

In accordance with a second aspect of the present invention, an image processing apparatus which converts a predetermined bit color image signal to be handled in an image input system for inputting an image to a N bit color image signal, with N as a positive integer, to be handled in an image output system for outputting an image, comprising:

a memory section which stores with a N+α bit color output value exceeding a color gamut of the color image signal to be handled in the image output system corresponding to a color input value to be handled in the image input system, the color gamut having gradient values not less than 0 and not more than $2^{N-1}$.

a processing section which reads out the color output value corresponding to the color input value from the memory section, and a color converting section which converts the N+α bit color output value to a N bit color image signal to be handled in the image output system.

In accordance with a third aspect of the present invention, an image processing method for converting a predetermined bit color image signal to be handled in an image input system for inputting an image is converted to a N bit color image signal to be handled in an image output system for outputting an image, N being a positive integer, comprising the step of:

converting a predetermined bit color image signal to be handled in the image input system to a N bit color image signal to be handled in the image output system based on a N+α bit color output value read out from a color conversion table from which the N+α bit color output value exceeding a color gamut of the color image signal to be handled in the image output system can be read out corresponding to a color input value of the color image signal to be handled in the input system is included, the color gamut having gradient values not less than 0 and not more than $2^{N-1}$.

In accordance with a fourth aspect of the present invention, an image forming apparatus which forms a color image comprised of cyan, magenta, yellow and black based on an inputted color image signal comprised of image signals of red, green and blue, comprising the image processing apparatus of the third aspect.

In accordance with a fifth aspect of the present invention, a recording media stored with a color conversion table for converting a predetermined bit color image signal to be handled in an image input system for inputting an image to a N bit color image signal, with N as a positive integer, to be handled in an image output system: for outputting an image, the conversion table comprising:

a N+α bit color output value, with a as a positive integer, exceeding-a color gamut of a color image signal to be handled in the image output system corresponding to a color input value to be handled in the image input system, the color gamut having gradient values not less than 0 and not more that $2^{N-1}$.

wherein the N+α bit color output value can be read out of the color conversion table corresponding to the color input value.

BRIEF DESCRIPTION OF THE DRAWINGS

FIG. 4 is a graphic representation of an example of color conversion and interpolation as the present embodiment;

DETAILED DESCRIPTION OF THE PREFERRED EMBODIMENT

Figure 1:
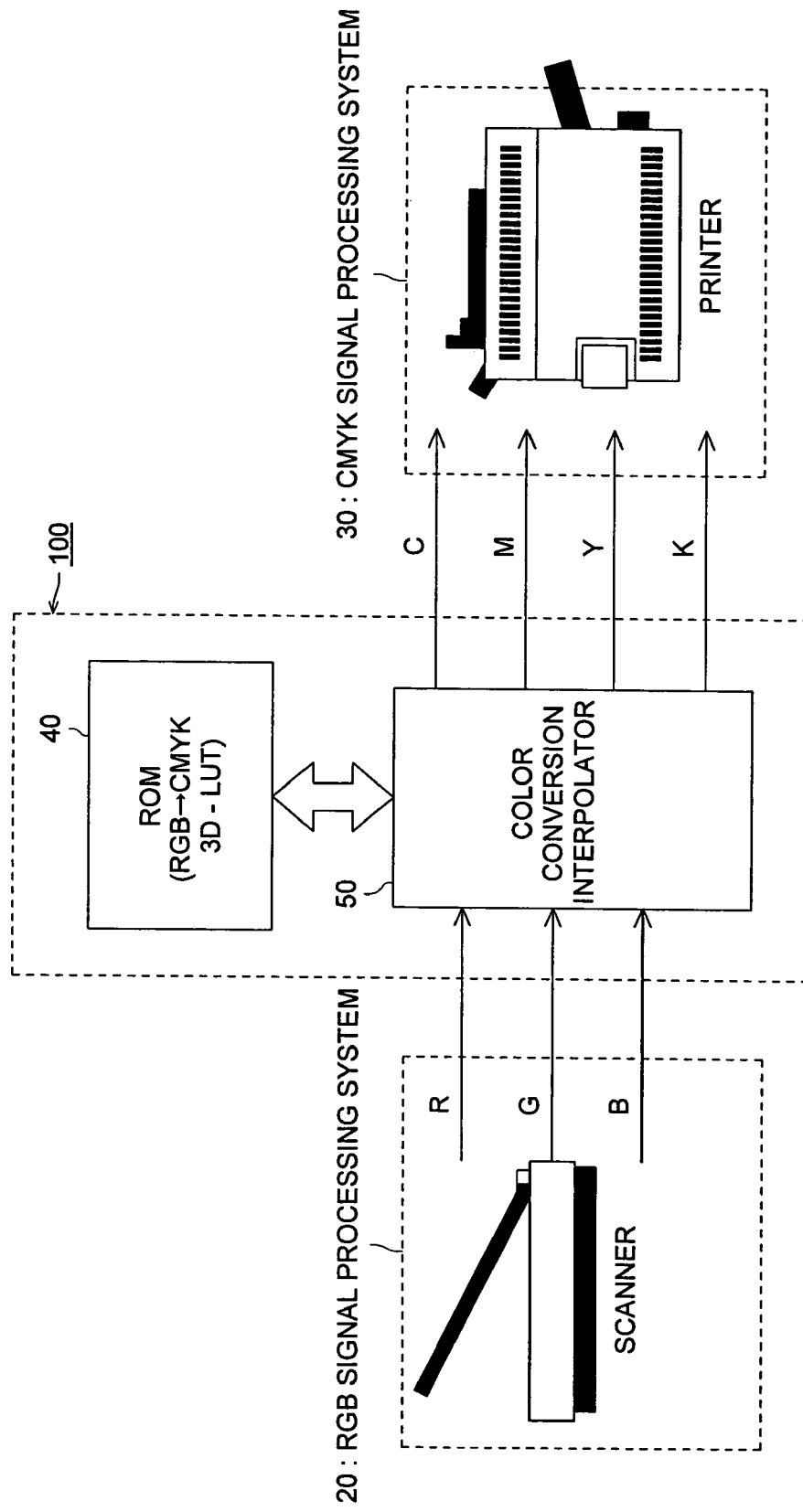
FIG. 1 is a block diagram showing an example of the structure of the image processing apparatus 100 as a first embodiment of the present invention.

Referring to the drawings, the following describes the method of producing a color conversion table, image processing apparatus, image processing method, image forming apparatus, and recording medium as embodiments of the present invention:

Embodiment 1

FIG. 1 is a block diagram showing an example of the structure of the image processing apparatus 100 as a first embodiment of the present invention.

The image processing apparatus 100 in FIG. 1 is used for conversion from the color image signal of a predetermined bit in the input system 20 into the N-bit color image signal in the output system 30. In this example, a scanner is arranged in the three-dimensional red (R), green (G) and blue (B) signal processing system (hereinafter referred to as "RGB signal processing system 20"), and a printer is arranged in the four-dimensional cyan (C), magenta (M), yellow (Y) and black (K) signal processing system (hereinafter referred to as "CMYK signal processing system 30"), for example.

The image processing apparatus 100 is installed between the scanner and printer, and operates in such a way that the color image signals R, G and B of the RGB signal processing system 20 obtained from the scanner, for example, is color-converted into the C, M, Y and K of the CMYK signal processing system 30. In this example, the image processing apparatus 100 is arranged between the scanner and printer for the sake of expediency. Needless to say, the image processing apparatus 100 can be mounted inside the scanner or printer.

The image processing apparatus 100 is composed of a ROM 40 and color conversion interpolator 50. The ROM 40 constitutes an example of the storage device. It stores a lookup table as a color conversion table associated with the CMYK value of N+α bit, including the color output value of 0 through $2^N-1$ gradient value in the printer color gamut area to be handled by the CMYK signal processing system 30 (hereinafter referred to as "CMYK value") and the CMYK value of less than 0 and more than $2^N$ gradient value outside the printer color gamut area, with respect to the color image signal R-, G- and B-color input value (hereinafter referred to as "RGB value") of a predetermined bit in the RGB signal processing system 20. This lookup table is a color conversion table for color conversion from the color image signal of a predetermined bit in the RGB signal processing system 20 to the color image signal of the N-bit signal in the CMYK signal processing system 30.

In this example, assume that N=8 and α=2. The ROM 40 contains a lookup table (hereinafter referred to as "RGB→CMYK3D–LUT2) for storing the 10-bit CMYK value including the CMYK value of 0 through 255 gradient value in the printer color gamut area to be handled by the CMYK signal processing system 30 and the CMYK value of less than 0 (negative value) and more than 255 gradient value outside the printer color gamut area. This arrangement is made to convert the 3D RGB color signal to the 4D CMYK color signal.

In this example, the number of bits of the CMYK value constituting the RGB→CMYK3D–LUT stored in the ROM 40 is only a bits greater than that of the bits of the color image signal in the CMYK signal processing system. The CMYK value contains the negative value and value of more than $2^N$ gradient value. This is intended to ensure that the color image signals R, G and B in the RGB signal processing system outside the printer color gamut area that cannot be handled by the CMYK signal processing system are subjected to color conversion and interpolation to become the color image signals C, M, Y and K of the upper limit or lower limit value in the printer color gamut area that can be handled by the CMYK signal processing system.

The color conversion interpolator 50 is an example of the dolor conversion unit. The color image signals R, G and B of a predetermined bit in the RGB signal processing system, based on the RGB→CMYK3D–LUT that can read the CMYK value of N+α bits read out of the ROM 40 is color-converted into the N-bit color image signals C, M, Y and K in the CMYK signal processing system.

The color image signals of the signal processing system of the input system can be CMYK signals, CMY signals, Lab signals or XYZ signals, in addition to the RGB signals. The color image signals of the signal processing system of the output system can be RGB signals, CMY signals, Lab signals or XYZ signals, in addition to the CMYK signals.

The color conversion interpolator 50 is constructed to ensure that all the color image signals R, G and B in the RGB signal system as an input system, located outside the printer color gamut area, that cannot be handled by the CMYK signal processing system 30 as an output system are subjected to color conversion and interpolation to become the color image signals C, M, Y and K having the upper limit or lower limit value in the printer color gamut area that can be handled by the CMYK signal processing system.

In this example, the ROM 40 loaded with the RGB→CMYK3D–LUT provides an example of the recording medium. The RGB→CMYK3D–LUT is created by executing, the steps of:

checking whether or not the input RGB values at the target of arithmetic processing is present outside the printer color gamut area of the color image signal to be handled by the CMYK signal processing system; and carrying out execution in the interpolation processing mode when the input RGB values at the target of arithmetic processing is located inside the printer color gamut area of the color image signal to be handled by the CMYK signal processing system; and in the extrapolation processing mode when the input RGB values at the target of arithmetic processing is located outside the printer color gamut area of the color image signal to be handled by the CMYK signal processing system.

The term "interpolation processing mode" in the sense in which it is used here refers to the processes of finding out the output CMYK values of the color image signal to be handled by the CMYK signal processing system corresponding to the input RGB values at the four apexes enclosing the input RGB values at the target of arithmetic processing, when the input RGB values are represented by displaying the color image signals R, G and B in the RGB signal processing system on the three-dimentional coordinate system for creating three-dimensional color information conversion table.

The term "extrapolation processing mode" in the sense in which it is used here refers to the processes of:

extracting the arithmetic processing reference point from the color image signal in the RGB signal processing system represented in the aforementioned three-dimensional coordinate system;

fixing it;

connecting the aforementioned the arithmetic processing reference point and another the target of arithmetic processing, using a straight line; and finding out the input RGB values at three apexes enclosing the input RGB values at the target of arithmetic processing, and the output CMYK values of the color image signal to be handled by the CMYK signal processing system corresponding to the RGB values at the arithmetic processing reference point.

The extrapolation processing mode includes-the process of finding out the CMYK values of less than 0 and more than $2^N$ gradient value outside the printer color gamut area that cannot be handled by the-CMYK signal processing system 30.

The aforementioned RGB→CMYK3D-LUT is structured in such a way as to ensure that, when the color image signal of the RGB signal processing system 20 is color-converted into the color image signals C, M, Y and K of the CMYK signal processing system 30, the color image signals R, G and B of the RGB signal processing system 20 outside the printer color gamut that cannot be handled by the CMYK signal processing System 30 can be color-converted into the CMYK value of the upper limit or lower limit value in the printer color gamut area to be handled by the CMYK signal processing system 30. Further, excellent reproducibility of the results of conversion can be achieved.

The following describes the RGB→CMYK3D-LUT in greater details.

Figure 2:
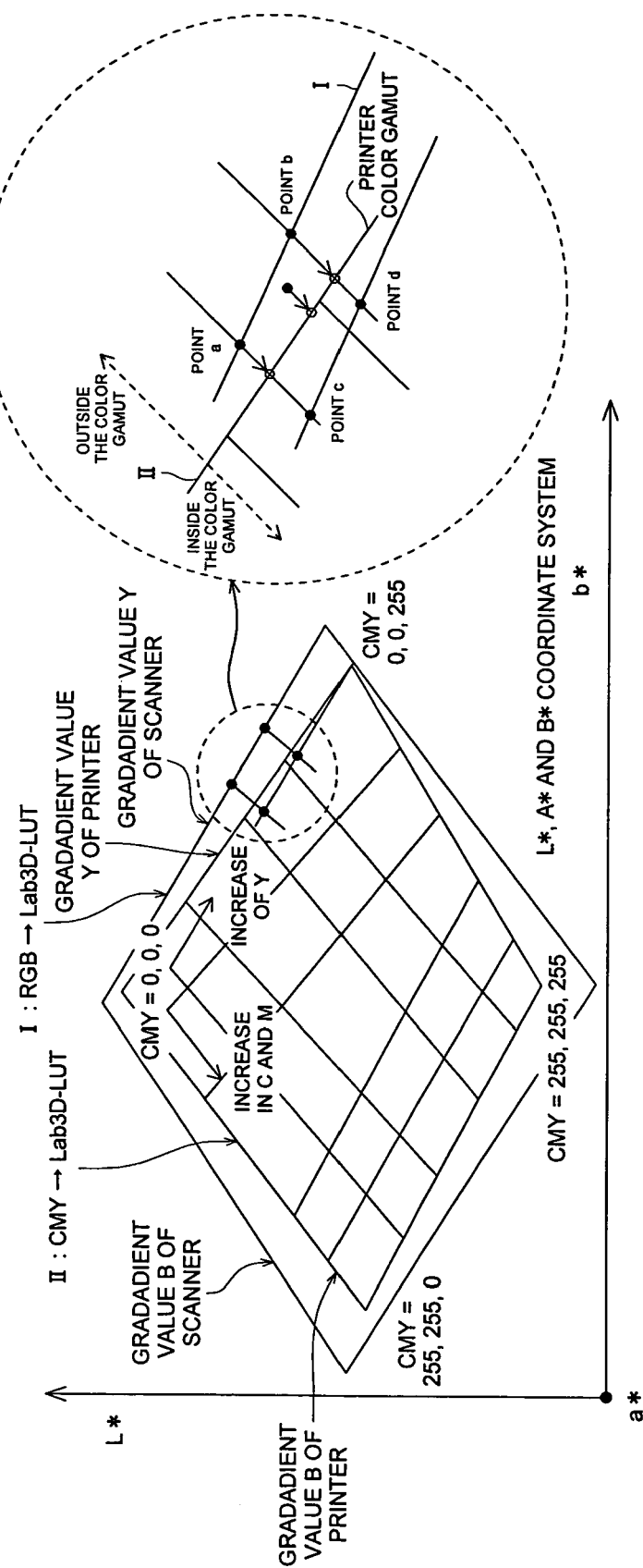
FIGS. 2 (A) and (B) are color coordinate system diagrams representing the examples of expansion of the CMY→Lab3D→LUT and RGB→Lab3D–LUT in the Lab color coordinate system.

FIGS. 2 (A) and (B) are color coordinate system diagrams representing the examples of expansion of the CMY→Lab3D-LUT and RGB→Lab3D-LUT in the Lab color coordinate system constituting the RGB→CMYK3D-LUT.

The vertical axis in FIG. 2A represents a brightness L* axis. The horizontal axis represents a chromaticity b* axis. Chromaticity a* axis is found at the intersection between the brightness L* axis and chromaticity b* axis. In FIG. 2A, the first lattice pattern I corresponds to the RGB→Lab3D-LUT wherein the 8-bit color image signals R, G and B of the RGB signal processing system is represented in 256 gradations. The contour line of the lattice pattern I shows the color gamut boundary handled by the RGB signal processing system.

In this example, the lattice pattern II displayed so as to be included in the lattice pattern I corresponds to the CMY→Lab3D-LUT wherein the 8-bit color image signals C, M, Y and K handled by the CMYK signal processing system are expressed in 256 gradations. The contour line of the lattice pattern II shows the color gamut boundary (hereinafter also referred to as "printer color gamut") handled by the CMYK signal processing system. CMYK values=[0, 0, 0] on the upper angular portion, CMYK values=[255, 255, 0] on the left angular portion, CMYK values=[255, 255, 255] on the lower angular portion, and CMYK values=[0, 0, 255] on the right angular portion.

In the RGB→Lab3D-LUT of the lattice pattern I, the line (side) downwardly sloping to the right indicates the Y-gradient value (0 through 255) of the scanner. The line (side) downwardly sloping to the left indicates the B gradient value (0 through 255) of the scanner. In the CMY→Lab3D-LUT of the lattice pattern II, the line (side) downwardly sloping to the right indicates the Y-gradient value (0 through 255) of the printer. The line (side) downwardly sloping to the left indicates the B gradient value (0 through 255) of the printer.

Both in the RGB→Lab3D-LUT and the CMY Lab3D-LUT lattice pattern, the more the line go down rightward, the more the Y-color increases and the more the line go down leftward, the more the B-color increases.

In this example, the standard for determining whether the aforementioned interpolation processing mode or extrapolation processing mode is to be executed is set to the printer color gamut (color gamut area to be handled by the CMYK signal processing system). Here the area inside the printer color gamut is defined as the inside of printer color gamut area and the area outside the printer color gamut as the outside of the printer color gamut area.

Figure 17:
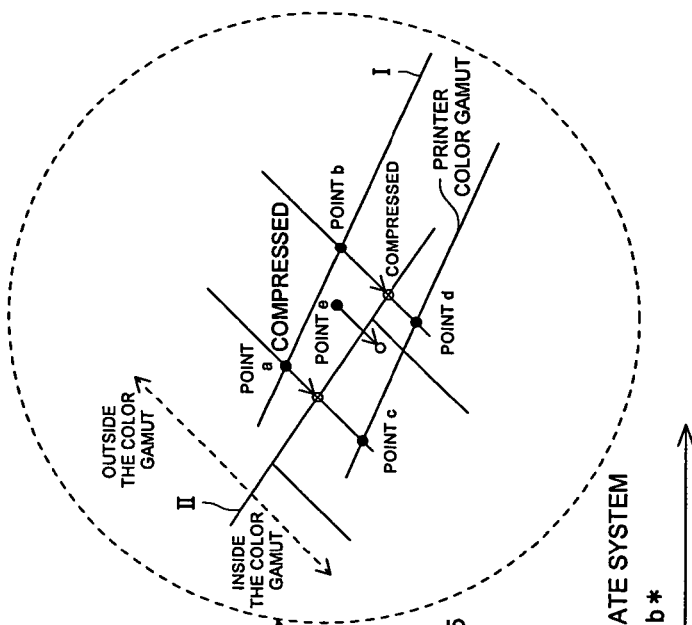
FIGS. 17A and 17B are the color coordinate system diagrams of the color coordinate system representing an example of the CMY→Lab3D–LUT and RGB→Lab3D–LUT in the conventional Lab color coordinate system.
Figure 17:
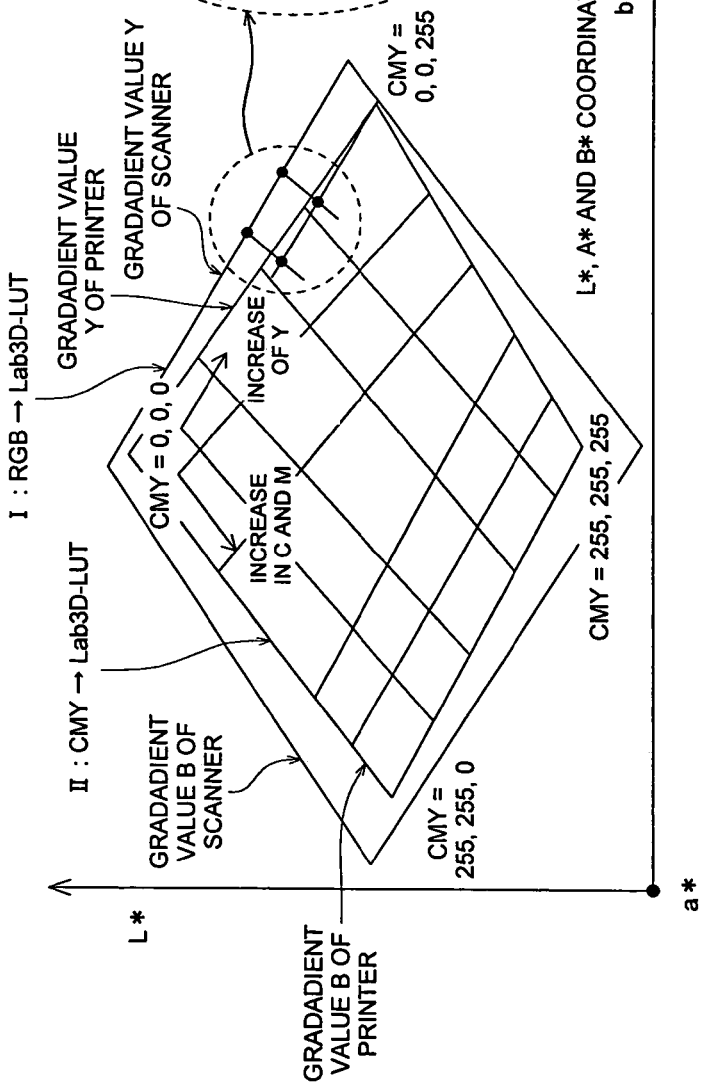
Figure 18:
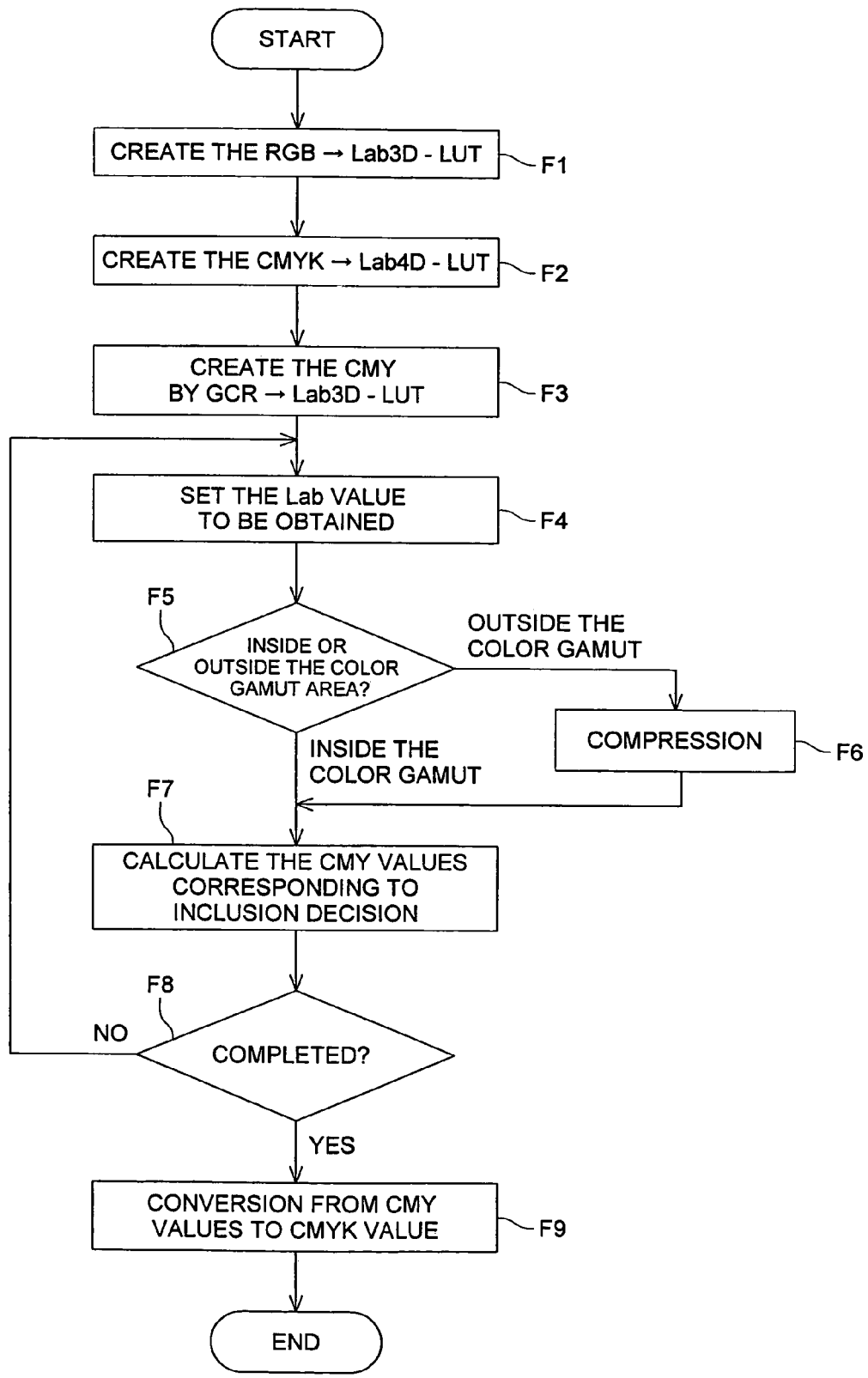
FIG. 18 is a flowchart representing the example of creating the conventional RGB→CMYK3D–LUT.

The circle showed in a broken line of FIG. 2B is an enlarged view of the area close to the printer color gamut in FIG. 2B. The RGB→Lab3D-LUT shown in FIG. 2B exhibits the case when the lattice point is located across the printer color gamut. In this example, the lattice points a and b are located outside the printer color gamut. The lattice points c and d are found inside the printer color gamut. This is the case where a non-lattice point (arithmetic processing reference point) e is given in the area enclosed by these four lattice points a, b, c and d and outside the printer color gamut. In this case, in the conventional method, when the input RGB values outside the printer color gamut are subjected to color conversion and interpolation as shown in FIG. 17B, then processing of compression is applied by the output CMYK values of four lattice points a, b, c and d, so that interpolation is carried out inside the printer color gamut (inside the printer color gamut area).

As contrasted with the above, in the method according to the present invention, the lattice points a and b outside the printer color gamut area is subjected to color conversion and interpolation onto the printer color gamut. Not only that, the non-lattice point e outside the printer color gamut area is also subjected to color conversion and interpolation onto the printer color gamut. To put it another way, when the input RGB values of the non-lattice point e outside the printer color gamut area is color-converted by the color conversion interpolator 50, it is clipped on the surface of the printer color gamut. When the color conversion and interpolation are carried out in this manner, the non-lattice point e subsequent to color conversion and interpolation does not come inside the printer color gamut, with the result that color difference can be reduced. Further, the printer color gamut can be used to its full capacity. This eliminates color mixing and improves color reproducibility.

Figure 3:
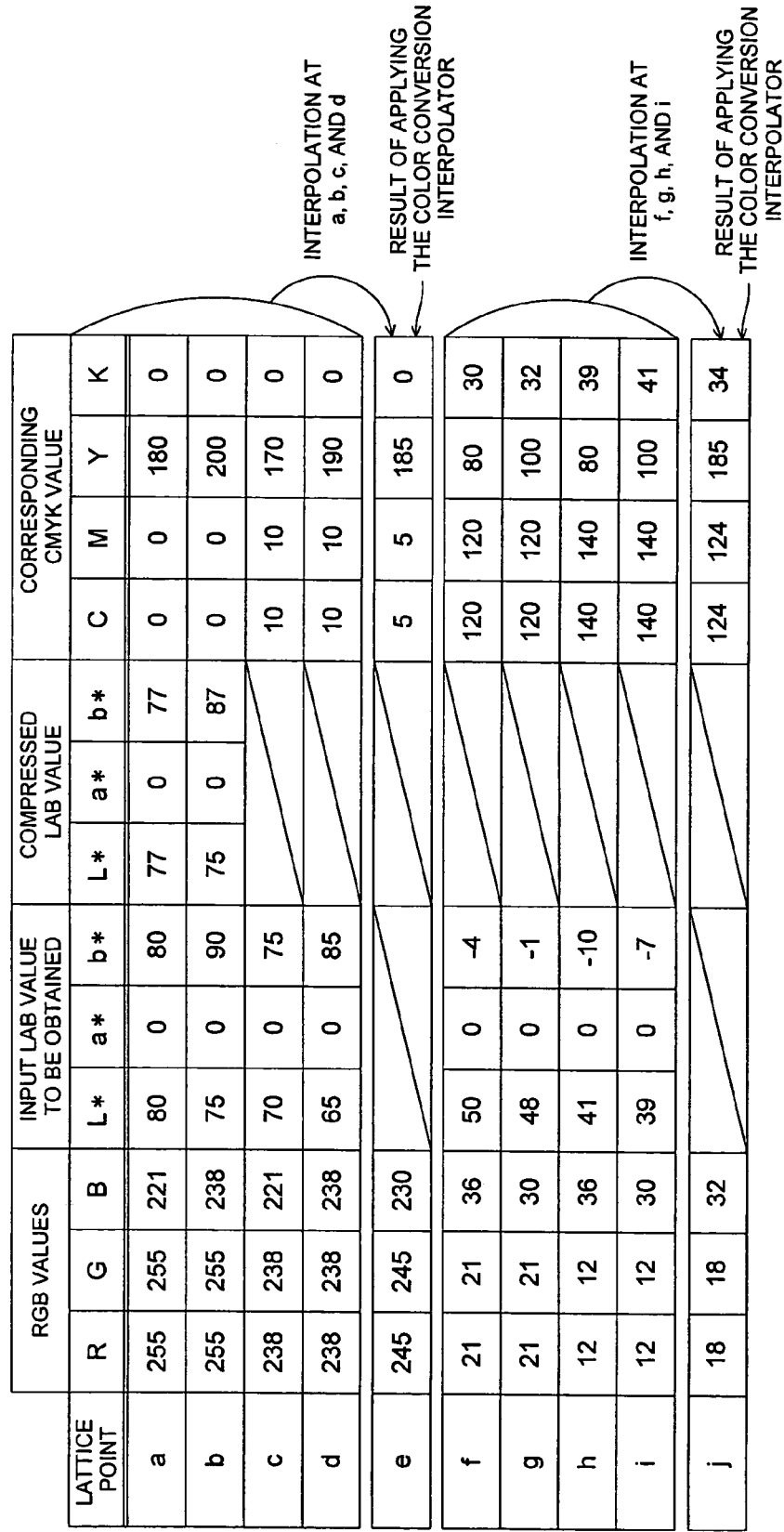
FIG. 3 is a graphic representation of an example of color conversion and interpolation by the conventional method.

The following describes the comparison between the conventional method and the color conversion and interpolation method of the present embodiment. FIG. 3 is a graphic representation of an example of color conversion and interpolation by the conventional method:

In the conventional method shown in FIG. 3, a RGB→CMYK3D-LUT compatible with processing of compression is created. For example, four lattice points a, b, c and d, and one non-lattice point e are subjected to color conversion and interpolation using the RGB→>CMYK3D-LUT compatible with processing of compression. Then the input Lab values [L*, a*, b*]=[80, 0, 80] are calculated in the Lab coordinate system, with respect to the input RGB values of the lattice point a=[255, 255, 221]. When the input Lab values are compressed, the Lab values are [L*, a* and b*]=[77, 0, 77]. The output CMYK values corresponding to these compressed Lab values are. [C, M, Y, K]=[0, 0, 180, 0].

Similarly, the input Lab values [L*, a* and b*][75, 0, 90] are calculated, with respect to the input RGB values=[255, 255 and 238 ] of the lattice point b. When the input Lab values are compressed, the Lab values are [L*, a* and b*]=[75, 0, 87]. The output CMYK values corresponding to this compressed Lab values are [C, M, Y, K]=[0, 0, 200, 0].

The input-Lab values [L*, a* and b*]=[70, 0, 75] are calculated, with respect to the input RGB values [238, 238, 221] of the lattice point c. The output CMYK values corresponding to this input Lab values are [C, M, Y, K]=[10, 10, 170, 0]. In the similar manner, the input Lab values [L*, a* and b*]=[65, 0, 85] are calculated, with respect to the input RGB values= [238, 238, 238] of the lattice point d. The output CMYK values corresponding to these input Lab values are [C, M, Y, K]=[10, 10, 190, 0].

In the conventional method, when the RGB→CMYK3D-LUT subjected to compression is used, the output CMYK values [C, M, Y, K]=[0, 0, 180, 0] are read out, with respect to the input RGB values=[255, 255, 221] of the lattice point a. The output CMY values [C, M, Y, K]=[0, 0, 200, 0] are read out, with respect to the input RGB values=[255, 255, 238] of the lattice point b. The output CMY values [C, M, Y, K]=[10, 10, 170, 0] are read out, with respect to the input RGB values= [238, 238, 221] of the lattice point c. The output CMY values [C, M, Y, K]=[10, 10, 190, 0] are read out, with respect to the input RGB values=[238, 238, 238] of the lattice point d. Thus, the output CMYK values at non-lattice point e are subjected to color conversion and interpolation using the output CMYK values at four lattice points a through d, and are changed into [C, M, Y, K]=[5, 5, 185, 0]. As shown in FIG. 17B, the output CMYK values are interpolated into the area inside the printer color gamut (inside the printer color gamut area).

For the lattice points f, g, h and i inside the printer color gamut area and one non-lattice point j, the input Lab values [L*, a* and b*]=[50, 0, −4] in the Lab coordinate system are calculated, respect to the input RGB values=[21, 21, 36] of the lattice point f. These Lab values are changed into [L*, a* and b*]=[77, 0, 77] .The output CMYK values corresponding to these compressed Lab values are [C, M, Y, K]=[120, 120, 80, 30]. In the similar manner, input Lab values [L*, a* and b*]=[48, 0, −1] are calculated with respect to the input RGB values [21, 21, 30] at the lattice point g. The output CMYK values corresponding to these Lab values are [C, M, Y, K]= [120, 120, 100, 32].

The input Lab values [L*, a* and b*]=[40, 0, 10] are calculated, respect to the input RGB values=[12, 12, 36] of the lattice point h. The output CMYK values corresponding to these input Lab values are [C, M, Y, K]=[140, 140, 80, 39]. In the similar manner, input Lab values .[L*, a* and b*]=[39, 0, −7] are calculated with respect to the input RGB values=[12, 12, 30] at the lattice point i. The output CMYK values corresponding to these input Lab values are [C, M, Y, K]=[140, 140, 100, 41].

In the conventional method, if the RGB→CMYK3D–LUT subjected to compression is used, the output CMYK values [C, M, Y, K]=[120, 120, 80 and 30] are read out, with respect to the input RGB values=[21, 21, 36] of the lattice point f. The output CMYK values [C, M, Y, K]=[120, 120, 100, 32] are read out, with respect to the input RGB values=[21, 21, 30] of the lattice point g. The output CMY values [C, M, Y, K]=[140, 140, 80, 39] are read out, with respect to the input RGB values=[12, 12, 36] of the lattice point h. The output CMYK values [C, M, Y, K]=[140, 140, 100, 41] are read out, with respect to the input RGB values [12, 12, 30] of the lattice point i. Thus, the output CMYK values at non-lattice point j are subjected to color conversion and interpolation using the output CMYK values at four lattice points f through i, and are changed into [C, M, Y, K]=[124, 124, 185, 34].

As contrasted with the above, the method according to the present invention uses the N+α bit RGB→CMYK3D-LUT containing:

the CMYK values of 0 through 255 gradient value in the printer color gamut area to be handled by the CMYK signal processing system 30; and the CMYK values of less than 0 and more than 256 gradient value outside the printer color gamut area.

FIG. 4 is a graphic representation of an example of color conversion and interpolation as the present embodiment. For four lattice points a, b, c, d and one non-lattice point e in FIG. 4, the process of compression used in the conventional method is eliminated according to the RGB→CMYK3D-LUT method. The input Lab values [L*, a* and b*1 ]=[80, 0 80] in the Lab coordinate system are calculated, with respect to the input the input RGB values=[255, 255, 221] at lattice point a. The output CMYK values corresponding to these input Lab values are [C, M, Y, K]=[0, 0, 180, 0]

In the similar manner, input Lab values [L*, a* and b*]= [75, 0, 90] are calculated, with respect to the input RGB values [255, 255, 238] at the lattice point b. The output CMYK values corresponding to these input Lab values are [C, M, Y, K]=[0, 0, 200, 0].

The input Lab values [L*, a* and b*]=[70, 0, 751 ] are calculated, with respect to the input RGB values=[238, 238, 221] at the lattice point c. The output CMYK values corresponding to these input Lab values [C, M, Y, K]=[−10, −10, 170, 0] are calculated. In the similar manner, the input Lab values [L*, a* and b*]=[65, 0, 85] are calculated, with respect to the input RGB values=[238, 238, 238] at the lattice point d. The output CMYK values corresponding to these input Lab values [C, M, Y, K]=[−10, −10, 190, 0] are calculated.

When the RGB→CMYK3D-LUT of the present invention is used for the color conversion table of the color conversion interpolator 50, the output CMYK values [C, M, Y, K]=[0, 0, 180, 0] are read out, with respect to the input RGB values= [255, 255, 221] of the lattice point a. The output CMYK values [C, M, Y, K]=[0, 0, 200, 0] are read out, with respect to the input RGB values=[255, 255, 238] of the lattice point b. The output CMYK values [C, M, Y, K]=[−10, −10, 170, 0] are read out, with respect to the input RGB values=[238, 238, 221] of the lattice point c. The output CMYK values [C, M, Y, K]=[−10, −10, 190, 0] are read out, with respect to the input RGB values=[238, 238, 238] of the lattice point d. Thus, the output CMYK values at non-lattice point e are subjected to color conversion and interpolation using the output CMYK values at four lattice points a through d, and are changed into [C, M, Y, K]=[0, 0, 185, 0] This arrangement allows interpolation to be achieved in such a way that the non-lattice point e will be positioned at the printer color gamut (at the upper and lower limit in the printer color gamut area) as shown in FIG. 2. Four lattice points f, g, h, i, and one non-lattice point j in the printer color gamut area are handled in the same method as the conventional one, and will not be described to avoid duplication.

The following describes the method of creating the color conversion table in the present embodiment. This example assumes the case where the color image signals R, G and B of the 8-bit RGB signal processing system 20 are subjected to conversion and interpolation and are changed into the 8-bit color image signals Y, M, C and K of the CMYK signal processing system 30.

For the RGB values of the color image signals in the RGB signal processing system 20, a RGB→CMYK3D-LUT is created, which can read the 10-bit CMYK values containing:

the CMYK values of 0 through 255 gradient value in the printer color gamut area to be handled by the CMYK signal processing system 30; and the CMYK values of less than 0 and more than 256 gradient value outside the printer color gamut area.

Figure 5:
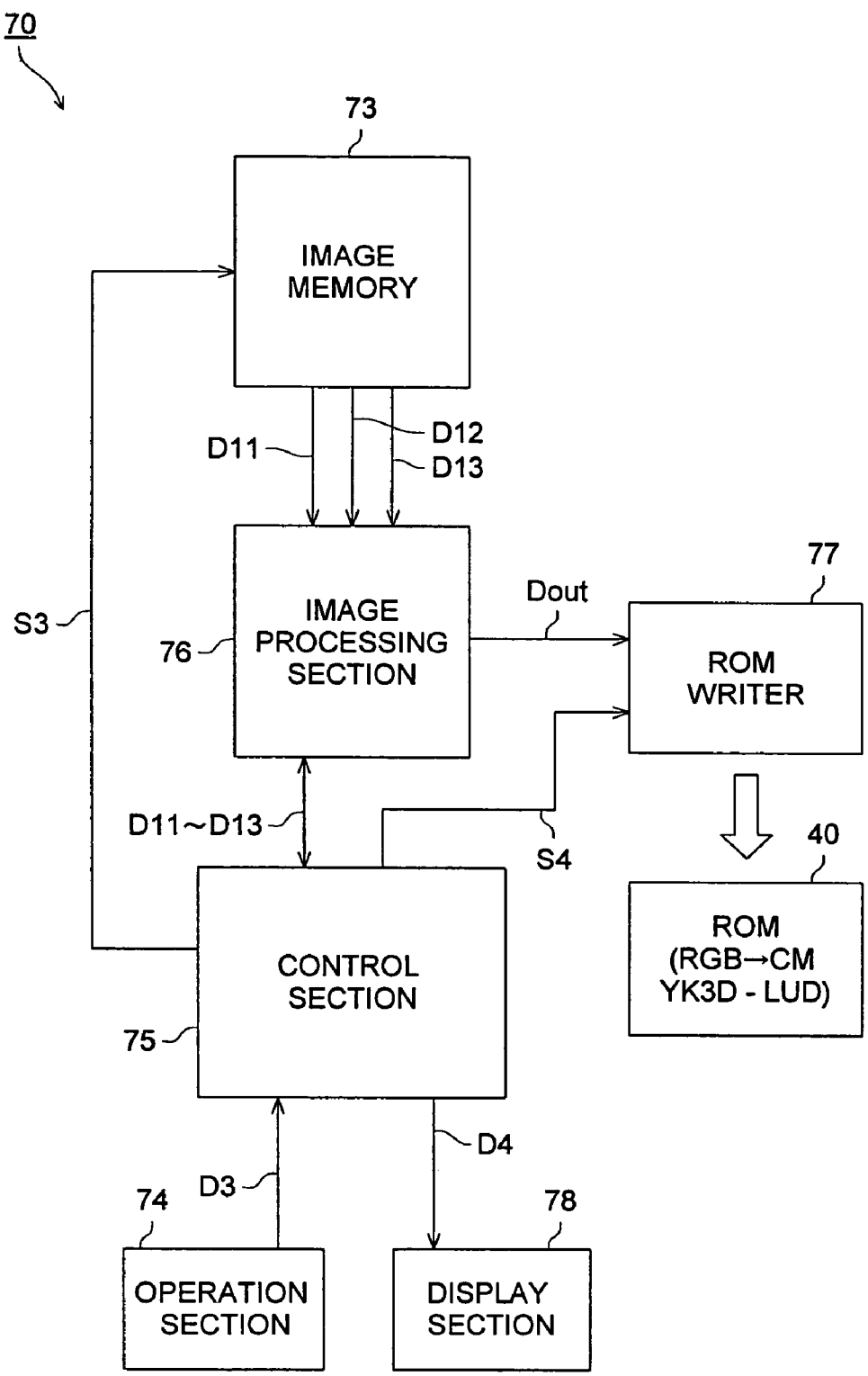
FIG. 5 is a block diagram representing an example of the structure of a table creating apparatus 70.

FIG. 5 is a block diagram representing an example of the structure of a table creating apparatus 70 for creating a RGB→CMYK3D-LUT.

The table creating apparatus 70 shown in FIG. 5 is used to create a RGB→CMYK3D-LUT, based on the RGB→Lab3D-LUT and the CMYK→4D-LUT. The table creating apparatus 70 is composed of an image memory 73, operation section 74, control section 75, image processing section 76, ROM writer 77 and display section 78.

The image memory 73 contains the input data D11, Lab data D12 and CMY data D13 used to create the RGB→Lab3D-LUT and CMYK→4D-LUT. The Lab data D12 contains the Lab values such as brightness L*, chromaticity a* and b*. The brightness L*, chromaticity a* and b* are represented in the brightness/chromaticity coordinate system (hereinafter referred to as "Lab color coordinate system").

The input data D11, Lab data D12, CMY data D13 and others are read into the RAM in the image processing section 76 from the image memory 73, based on the memory control signal S3. The memory control signal S3 is outputted from the control section 75 to the image memory 73. A hard disk and DRAM are used as the image memory 73. In this example, the 8-bit input RGB values, i.i.e. the 256 gradations are separated into 33 gradations in units of 8 gradations, and each division is assigned with 0 through 32. Assume that the RGB values as the target of arithmetic processing of this input data D1 is "$p_in$", and the output Lob value of the Lab data D12 is "$q_{out}$".

The image memory 73 is connected with the image processing section 76. The image processing section 76 is composed of a DSP (Digital Signal Processor), RAM and others. The control section 75 contains a CPU, ROM and RAM. The image processing section 76 is connected with the control section 75.

The control section 75 is connected with the operation section 74 and display section 78. The operation section 74 is operated to select the gradation numbers equal in terms of each of the RGB axes in the color three-dimensional coordinate system obtained from the RGB→Lab3D-LUT, for example. This selection operation is used to set the input RGB values of the arithmetic processing reference point pc. The data set on the operation section 74 is outputted to the control section 75 as an operation data D3. A color three-dimensional coordinate system and others are displayed on the display section 78, based on the display data D4. The data stored as graphic display tool in the memory section arranged in the control section 75 or image processing section 76 is used as the display data D4.

The control section 75 outputs the input RGB values to the image processing section 76 when calculating the Lab CMYK values in the Lab color coordinate system corresponding to the input RGB values of the target of arithmetic processing pin based on the operation data D3 outputted from the operation section 74. For example, the control section 75 sets center RGB values for the image processing section 76. This example assumes the case where the center RGB values as the arithmetic processing reference point pc are set to the R=G=B=17th step in the lattice points of 33 gradations. The center RGB values can be set at other step than the 17th step. Assume that the input RGB value of this arithmetic processing reference point pc is "pc" and the Lab value thereof is "qc".

In response to the operation of the operation section 74 and control of the control section 75, the image processing section 76 performs color gamut surface searching operation. When the input data D11 is inputted, the image processing section 76 performs the processes of triangle setting, triangular pyramid setting, inclusion determination and color gamut area in/out decision, as will be described later.

The control section 75 generates the RGB→CMYK3D-LUT based on the result of color gamut area in/out decision obtained from the image processing section 76. In this case, if the input RGB values of the target of arithmetic processing $p_{in}$ detected by the image processing section 76 is located inside the printer color gamut area, the control section 75 executes the interpolation processing mode. If the input RGB values of the target of arithmetic processing $p_{in}$ are located outside the printer color gamut area, the control section 75 executes the extrapolation processing mode. In the extrapolation processing mode, the control section 75 calculates the Lab CMYK values of the Lab color coordinate system corresponding to the input RGB values of the target of arithmetic processing $p_{in}$ and carries out extrapolation.

The ROM writer 77 is connected to the control section 75 and image processing section 76i and writes the RGB→CMYK3D-LUT to the mask ROM in response to the ROM write signal S4 and the ROM data Dout. ROM data Dout constitutes the RGB→CMYK3D-LUT. The ROM write signal S4 is outputted to the ROM writer 77 from the control section 75. A decision step is taken to determine if the CMY→Lab3D-LUT is loaded inside or outside the color gamut area (color gamut area in/out decision).

Figure 6:
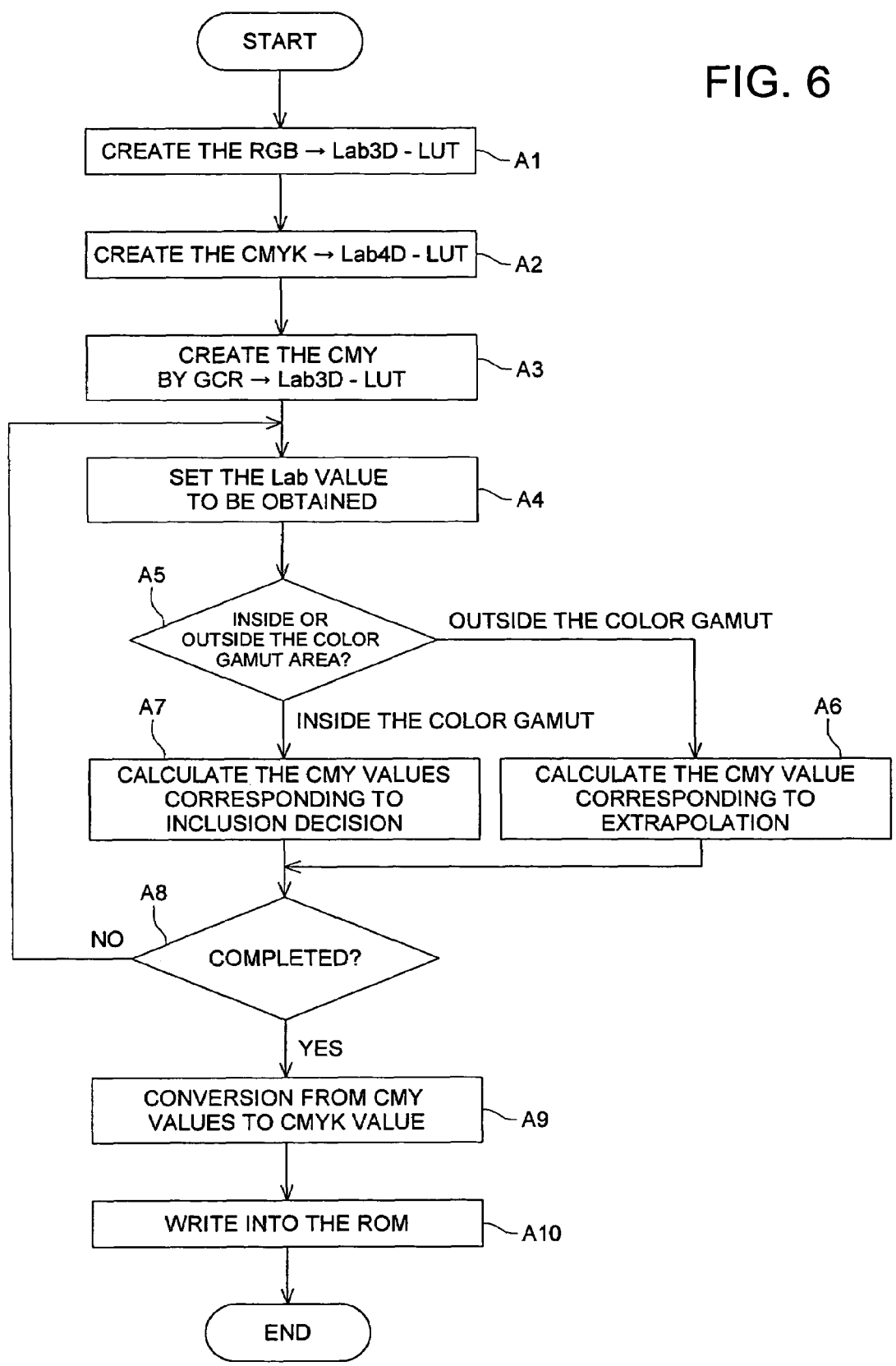
FIG. 6 is a flowchart (main routing) representing an example of creating the RGB→CMYK3D–LUT.
Figure 7:
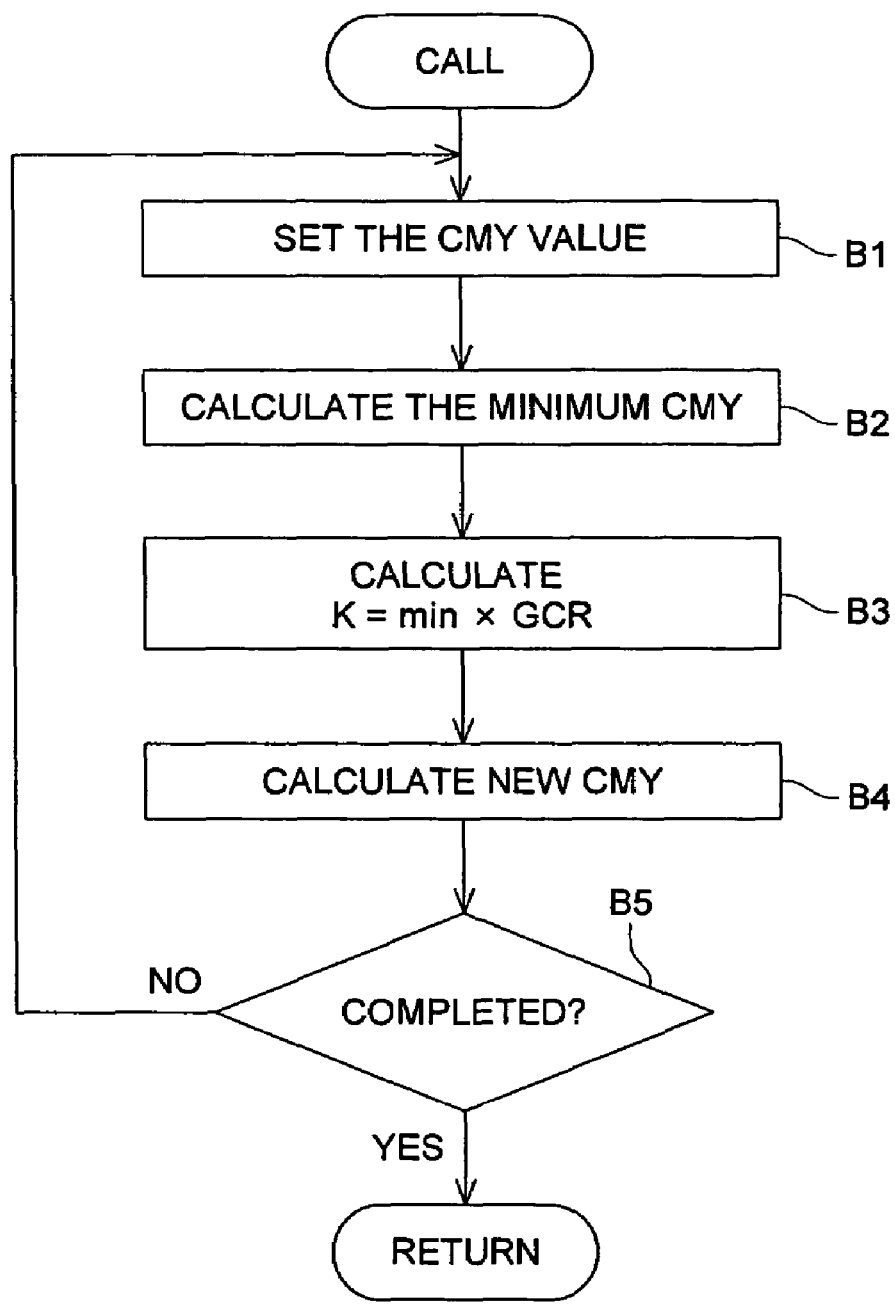
FIG. 7 is a flowchart representing an example of creating the CMY→CMYK3D–LUT by the GCR algorithm.
Figure 8:
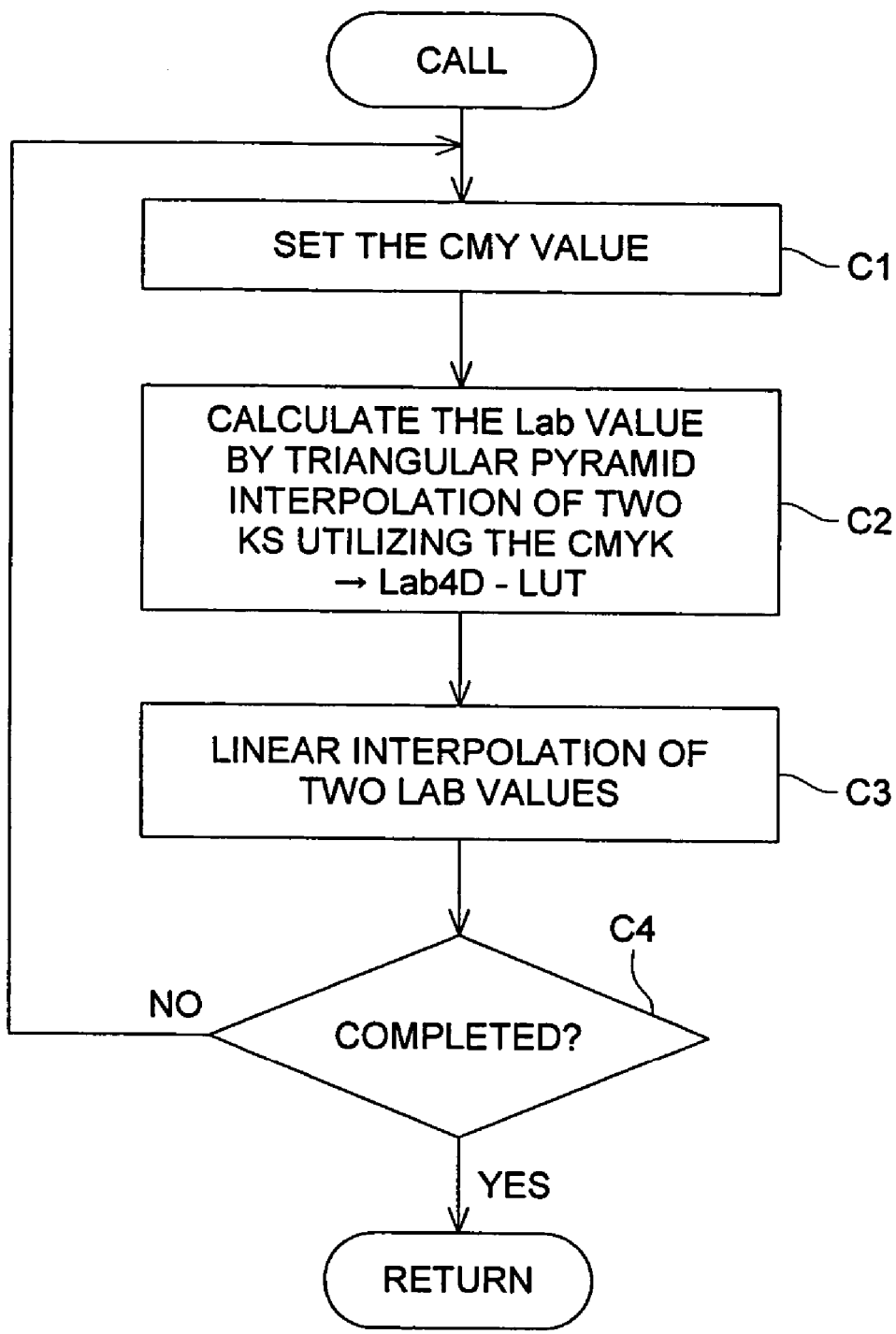
FIG. 8 is a flowchart (subroutine) representing each of the-examples of creating the CMY→4 Lab3D–LUT.

FIG. 6 is a flowchart (main routing) representing an example of creating the RGB→CMYK3D-LUT by the table creating apparatus 70. FIG. 7 is a flowchart representing an example of creating the CMY→CMYK3D-LUT by the GCR algorithm. FIG. 8 is a flowchart (subroutine) representing each of the examples of creating the CMY→Lab3D-LUT.

This example assumes that the image memory 73 is loaded with the input data D11 and Lab data D12 for creating the RGB→Lab3D-LUT. Further, the CMY data D13 constituting the CMYK→Lab4D-LUT is stored in advance. In this example, only when the location is inside the printer color gamut area as a result of color gamut area in/out decision, the system proceeds to the interpolation processing mode. It proceeds to the extrapolation processing modem if the location is outside the printer color gamut area as a result of the decision. Then the corresponding CMY values are obtained in the relevant mode. If the location is determined to be outside the printer color gamut area, the inclusion decision step in the interpolation mode is skipped.

With the aforementioned conditions as the table creation conditions, the input data D11 and Lab data D12 are read out to the image processing section 76 from the image memory 73 in response to the instruction of the control section 75 in the Step A1 of the flowchart in FIG. 6, and are displayed on the RAM and others. The RAM displays the input data D11 and Lab data D12 so that the RGB→Lab3D-LUT can be created. The RGB→Lab3D-LUT is created according to the image processing method disclosed in the Official Gazette of Japanese Patent No. 3174604, for example. Other methods can be used to create the table if only the RGB→Lab3D-LUT is prepared. In this example, the number of lattice points is 16×16'16 (=4,096).

In response to the instruction from the control section 75, the CMY data D13 is read out of the image memory 73 into the image processing section 76 in Step A2, and is displayed on the RAM and others. The CMY data D13 is displayed on the RAM and the CMYK→Lab4D-LUT is created. The CMYK→Lab4D-LUT is generated according to the image processing method disclosed in the Official Gazette of Japanese Patent Tokkaihei 06-242523, for example. Other methods may be used to create the table if only CMYK→Lab4D-LUT is prepared. The number of lattice points is 17×17×17×17 (=83,521).

The system goes to Step A3. The image processing section 76 creates the CMY→Lab3D-LUT from the CMYK→Lab4D-LUT according to the GCR algorithm. In this case, about 33×33×33 (=35,937), for example, is set as the number of the lattice points of the CMY→Lab3D-LUT. The CMY→Lab3D-LUT having such a number of the lattice points is created in two steps—a step of creating a CMY→GMYK3D-LUT according to the GCR algorithm; and a step of creating the CMY→Lab3D-LUT by triangular pyramid interpolation utilizing the CMYK→Lab4D-LUT.

[Creating the CMY→CMYK3D-LUT]

This processing is provided by the image processing section 76. To create the CMY→CMYK3D-LUT according to the GCR algorithm, for example, the subroutine given in FIG. 7 is called up and the CMY values are set in Step B1. In this case, the CMY values are each stepped up to 0 through 32, and the CMYK values are calculated using each of the CMY values. This procedure is repeated in sequence.

Then the system goes to Step B2. The minimum value out of the CMY values set in advance is outputted. For example, if the calculated values are C=10, M=12 and Y=7, then the minimum value (min.) is min=7. After that, the system goes to Step B3 to calculate the black value K. In this example, the aforementioned min is multiplied by GCR (Gray Component Replacement (also called UCR: Under Color Removal)). Namely, the black value K is given by Eq. (1):

$$K = \min \times GCR \text{ (UCR)} \quad (1) \text{ (Success of K)}$$

The aforementioned GCR indicates the percentage of generating the black value K. A value in the range from 0.0 through 1.0 is adopted. For example, when the GCR is 0.9, K=7×0.9=6.3. In this example, the greater the K value, the more the black is used. The smaller the K value, the less the black is used.

A new CMY value is calculated in Step B4. In this example, the aforementioned K values are subtracted from the original C, M and Y values to calculate a new C, M and Y values. Assume, for example, that a new C value, M value and Y value are new C, new M, and new Y.

new $C=C-K$→new $C=10-6.3=3.7$ new $M=M-K$→new $M=12-6.3=5.7$ new $Y=Y-K$→new $Y=7-6.3=0.7$ (2)

From the above, the CMYK values for a certain CMY value are calculated. After that, the system goes to Step B5, and a decision step is taken to determine whether or not the CMYK values for all CMY data D13 have been calculated (End decision). If the CMYK values for all CMY data D13 have not been calculated, the system goes back to Step B1 and the aforementioned procedure is repeated. If the CMYK values for all CMY data D13 are calculated, then the CMY→CMYK3D-LUT is created.

[Creating the CMY→Lab3D-LUT]

This processing is executed by the image processing section 76. This CMY→Lab3D LUT is created by the triangular pyramid interpolation utilizing the CMYK→Lab4D-LUT. LUT. For example, each of the CMYK values of the CMY→CMYK3D-LUT created in Steps 1 through 5 is converted into the Lab values utilizing the CMYK→Lab4D-LUT. This conversion is repeated until the CMY→Lab3D-LUT is created.

For example, to create the CMY→Lab3D-LUT according to the GCR algorithm, the subroutine given in FIG. 8 is called up and the CMY values are set in Step C1. In this example, when the each of CMYK values is such that C=135, M=232, Y=96 and K=8 for the CMY→CMYK3D-LUT created in advance, the CMYK (K=1st)→Lab3D-LUT and CMYK (K=2nd)→Lab3D-LUT are utilized from the CMYK→Lab4D-LUT by reference to K=8.

In Step C2, the Lab value is calculated by the triangular pyramid interpolation based on two K values, using the CMYK→Lab4D-LUT. For example, the Lab values corresponding to the addresses C=135, M=232 and Y=96 are calculated from the CMYK (K=1st)→Lab3D-LUT according to the triangular pyramid interpolation. As a result of this triangular pyramid interpolation, the Lab values of K=1st (hereinafter referred to as "Lab1") is given by Lab1=[L, a, b]=[35, 37, −4].

Further, the Lab values corresponding to the addresses C=135, M=232 and Y=96 are calculated from the CMYK (K=2nd)→Lab3D-LUT according to the triangular pyramid interpolation. As a result of this triangular pyramid interpolation, the Lab values of K=2nd (hereinafter referred to as "Lab2") is given by Lab2=[L, a, b]=[34, 36, −4].

The Lab1 and Lab 2 obtained in Step C3 undergo linear interpolation based on the-black K value. Assume that a new Lab value for K=8 is new Lab.

$$\text{new Lab} = ((16-K(=8))/16) \times \text{Lab 1} + ((16-K(=8))/16) \times \text{Lab 2} \quad (3)$$

Then Lab1 and Lab 2 are substituted into Eq. (3) and the new Lab is calculated. This will yield new Lab=[L, a, b]=[34, 37, −4]. The new Lab obtained in this manner represents a Lab value for CMYK values with respect to the K value.

After that, the system proceeds to Step C4. A decision step is taken to determine if the Lab values with respect to the CMYK values in the K value of all the CMY data D13 have been calculated or not (End decision). If the Lab values with respect to the CMYK values in the K value of all the CMY data D13 have not yet been calculated, the system proceeds to Step C1 and the aforementioned processing is repeated. If the Lab values with respect to the CMYK values in the K value of all the CMY data D13 have been calculated, and the operation has been repeated the number of times corresponding to the lattice points, the CMY→Lab3D-LUT is created.

If the CMY→CMYK3D-LUT and CMY→Lab3D-LUT is created by the aforementioned two subroutines, the system goes back to the Step A3 of the main routine. Then it goes to Step A4, where the Lab value to be found out is set in the Lab coordinate system. In this case, the CMY values corresponding to the Lab values of the RGB→Lab3D-LUT are calculated from the CMY→Lab3D-LUT. In this Lab coordinate system, the target of arithmetic processing is set as "$p_{in}$".

Then the system goes to Step A5 and finds out the preset Lab value from the CMY→Lab3D-LUT. A decision step is taken to determine if this Lab value is located inside or outside the color gamut area of the CMY→Lab3D-LUT (a color gamut area in/out decision step). Here for the first time, the C=M=Y=16th Lab value as a median of the arithmetic processing reference point is set as "pc" with respect to the CMY values of the CMY→Lab3D-LUT. The three sets forming the apexes of a triangle on the surface of this 3D-LUT are set sequentially (a triangle setting step). In this example, the surface as a minimum unit in the color gamut surface is a triangle composed of three pieces of input data D11.

The Lab values of these apexes are defined as p1, p2 and p3. In the similar manner, the CMY values of the addresses of these arithmetic processing reference points and apexes are defined as qc, q1, q2 and q3. $X_0$, $X_1$ and $X_2$ represent the weighting factors, for example, in the Lab coordinate system set at the arithmetic processing reference point that assumes the median pc of the Lab value. In this example, the target of arithmetic processing of Lab value=$p_{in}$ is given at the position going through the triangle in such a way that the Lab values of the lattice points represent p1, p2 and p3.

Here for the Lab value of the CMY→Lab3D-LUT, assume that the C=M=Y=16th Lab value as the median thereof is a arithmetic processing reference point pc, the target of arithmetic processing is $p_{in}$, the Lab values of the apexes set on the surface of the 3D-LUT are p1, p2 and p3, and the weighting factors in the Lab coordinate system set on the arithmetic processing reference point pc are $X_0$, $X_1$ and $X_2$. Based on this assumption, the relationship between the arithmetic processing reference point pc and the target of arithmetic processing Pin can be expressed in Eq. (4):

[Eq. 1]

$$pin - pc = \begin{bmatrix} p1 - pc \\ p2 - pc \\ p3 - pc \end{bmatrix} \cdot (X_0 \quad X_1 \quad X_2) \quad (4)$$

Figure 9:
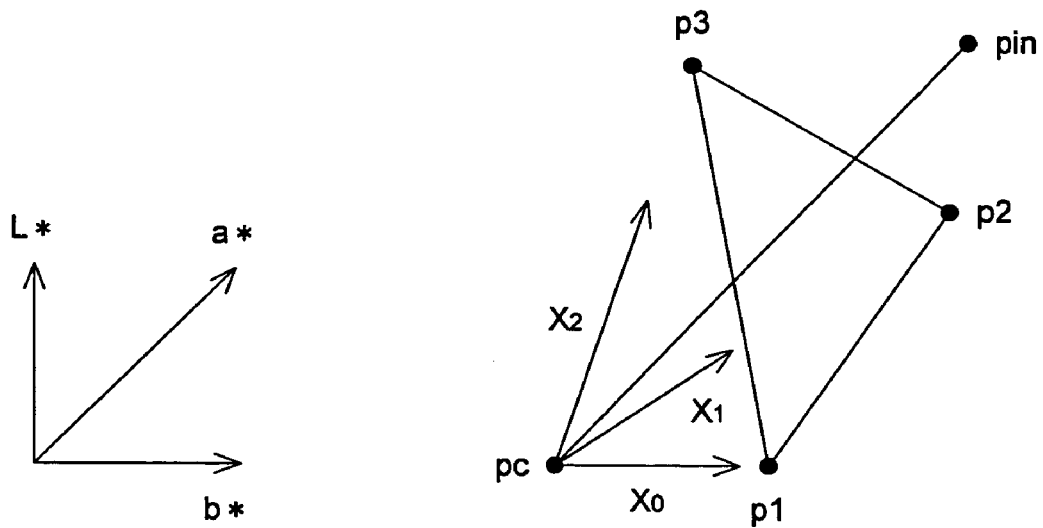
FIG. 9 is a diagram representing an example of searching the color gamut surface of the target of arithmetic processing $p_{in}$ in the Lab coordinate system.

FIG. 9 is a diagram representing an example of searching the color gamut surface of the target of arithmetic processing $p_{in}$ in the Lab coordinate system. According to the example of searching the color gamut surface in FIG. 9, a search operation is performed to find out which of the color gamut surfaces of the input data D11 that intersects the straight line connecting between the input RGB values of the target of arithmetic processing $p_{in}$ and the center RGB values of arithmetic processing reference point pc. For example, the Lab values set (inputted) in the image processing section 76 are found out from the CMY→Lab3D-LUT.

The aforementioned mathematical relation is solved to find out the weighing factors $X_0$, $X_1$ and $X_2$. In this case, if $X_0>0$, $X_1>0$, $X_2>0$ and $X_0+X_1+X_2<1$, then the target of arithmetic processing Pin is located inside the printer color gamut area. If $X_0>0$, $X_1>0$, $X_2>0$ and $X_0+X_1+X_2\geq1$, then the target of arithmetic processing $p_{in}$ is located outside the printer color gamut area.

If it has been determined according to the aforementioned color gamut area in/out decision step that the target of arithmetic processing $p_{in}$ is outside the printer color gamut area, the system goes to Step A6. Using the CMY→Lab3D-LUT, the system calculates the CYM values ($q_{out}$) with respect to the input Lab values in the extrapolation mode utilizing the following equation (5) and its expansion thereof (Extrapolation mode).

Figure 10:
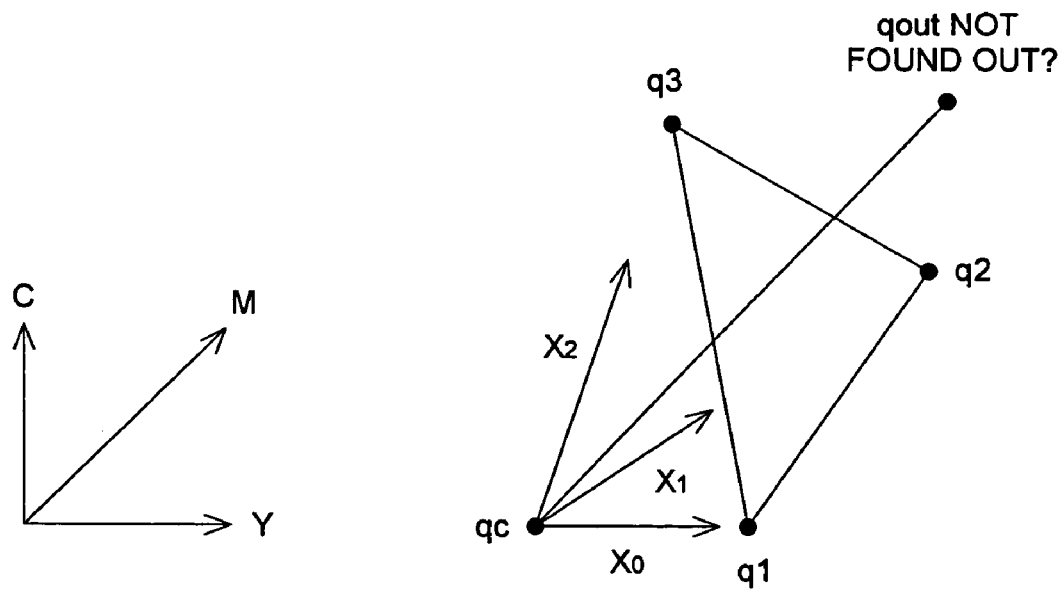
FIG. 10 is a diagram showing an example of searching the color gamut surface in the CMY coordinate system.

The following describes the equation (5) to be used in the extrapolation mode: Eq. (5) is obtained by color gamut surface searching. FIG. 10 is a diagram showing an example of searching the color gamut surface in the CMY coordinate system. According to the example of searching the color gamut surface given in FIG. 10, the CMY values ($q_{out}$) with respect to the input Lab values are calculated in the extrapolation mode, when the output CMYK values of the arithmetic processing reference point qc in the CMY coordinate system and CMY values of the apexes, and the CMY values of apexes are assumed as q1, q2 and q3.

For the CMYK values in the CMY→Lab3D-LUT, assume that the CMY values at the arithmetic processing reference points are $q_{out}$, the CMYK values of the addresses of the lattice points set on the surface of the aforementioned 3D-LUT are q1, q2 and a3, the CMY value of the addresses set at the arithmetic processing reference points is qc, and the weighting factors in the CMY coordinate system are $X_0$, $X_1$ and $X_2$. Based on this assumption, the $q_{out}$ can be expressed in Eq. (5):

[Eq. 2]

$$qput = \begin{bmatrix} q1 - qc \\ q2 - qc \\ q3 - qc \end{bmatrix} \cdot (X_0 \quad X_1 \quad X_2) + qc \quad (5)$$

This is expanded as follows:

$q_{out\_}C=(q1\_C-qc\_C)\times X_0+(q2\_C-qc\_C)\times X_1+(q3\_C-qc\_C)\times X_2+qc\_C$ $q_{out\_}M=(11\_M-qc\_m)\times X_0+(q2\_M-qc\_M)\times X_1+(q3\_M-qc\_M)\times X_2+qc\_M$ $q_{out\_}Y=(q1\_Y-qc\_Y)\times X_0+(q2\_Y-qc\_Y)\times X_1+(q3\_Y-qc\_Y)\times X_2+qc\_Y$ The negative values are obtained by calculation of Eq. (5). It is also possible to solve the Eq. (5) in advance and to store it in the ROM of the image processing section 76.

Figure 11:
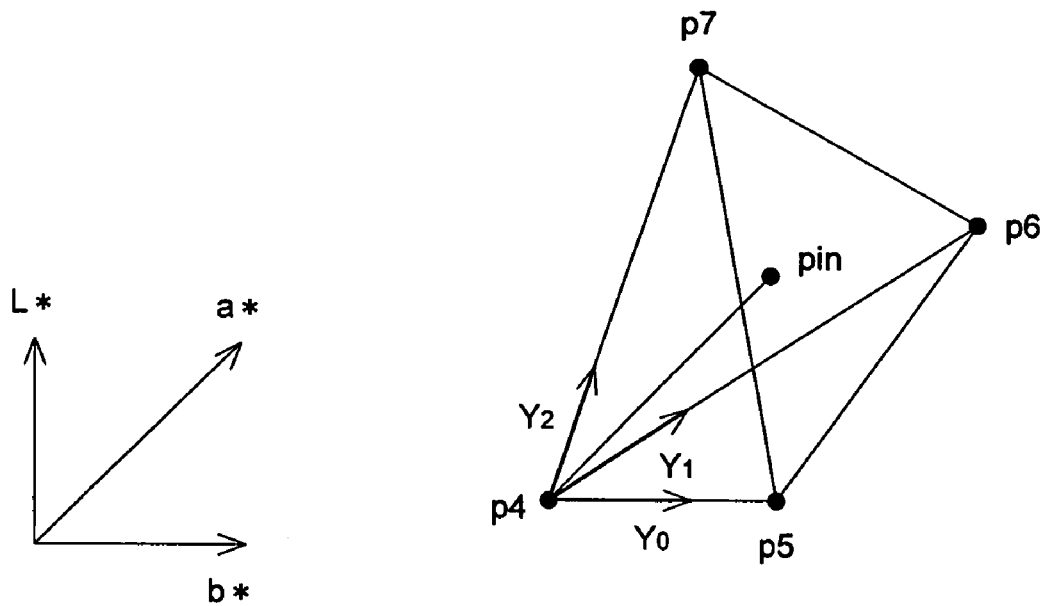
FIG. 11 is a diagram showing an example of determining inclusion in the Lab coordinate system.

If it has been determined in the aforementioned Step A5 that the target of arithmetic processing $p_{in}$ is located inside the printer color gamut area, the system goes to Step A7. The CMY values are found out by the inclusion decision from the CMY→Lab3D-LUT using the preset Lab value. The CMY values corresponding to this inclusion decision are calculated. To perform inclusion decision, the Lab values at four points (points p4, p5, p6 and p7) are sequentially set from the CMY→Lab3D-LUT. Similarly, the CMY values at four points (points q4, q5, q6 and q7) are set (triangular pyramiol setting step). The following describes the inclusion decision in the Lab coordinate system: FIG. 11 is a diagram showing an example of determining inclusion in the Lab coordinate system. According to the example of inclusion decision given in FIG. 11, a decision step is taken to determine if the input RGB values of the target of arithmetic processing pin are included or not in the plot area of the input RGB, values (inclusion decision step). In this example, the lattice points having the minimum volume in $5^3$ pieces of input data D11 are four lattice points constituting a triangular pyramid. In this example, triangular pyramid processing is executed and a plurality of triangular pyramids are set sequentially. Assume that the Lab values of the lattice points of the set triangular pyramids are p4, p5, p6 and p7. $Y_0$, $Y_1$ and $Y_2$ represent the weighting factors, for example, in the Lab coordinate system set at the arithmetic processing reference point taking the median p4 of Lab values. In this example, the arithmetic processing reference point of Lab value=$p_{in}$ is given inside the triangular pyramid where the Lab values of the lattice points are represented by p4, p5, p6 and p7.

For the Lab values of the CMY→Lab3D-LUT, assume that the C=M=Y=16th Lab value as the median thereof is a arithmetic processing reference point pc, the target of arithmetic processing is $p_{in}$, the Lab values of the lattices on the surface of the 3D-LUT are p4, p5, p6, and p7, and the weighting factors in the Lab coordinate system set on the arithmetic processing reference point p4 are $Y_0$, $Y_1$ and $Y_2$. Based on this assumption, the relationship between the arithmetic processing reference point p4 and the target of arithmetic processing pin can be expressed in Eq. (6):

[Eq. 3]

$$pin - p4 = \begin{bmatrix} p5 - p4 \\ p6 - p4 \\ p7 - p4 \end{bmatrix} \cdot (Y_0 \quad Y_1 \quad Y_2) \quad (6)$$

Figure 12:
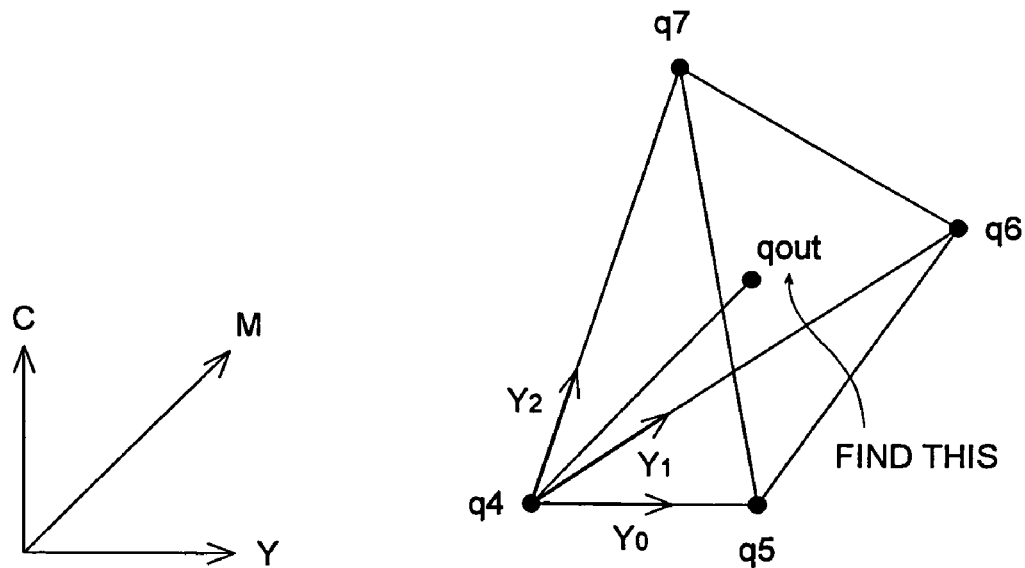
FIG. 12 is a diagram showing an example of determining inclusion in the CMY coordinate system.

The aforementioned mathematical relation is solved to find out the weighting factors $Y_0$, $Y_1$ and $Y_2$. In this case, if $Y_0 > 0$, $Y_1 > 0$, $Y_2 > 0$ and $Y_0 + Y_1 + Y_2 < 1$, then it is included in the triangular pyramid. Thus, the corresponding CMY values ($q_{out}$) are obtained from the weighting factors $Y_0$, $Y_1$ and $Y_2$ and the Lab values q4, q5, q6 and q7 at four lattice points. For example, the CMY values ($q_{out}$) with respect to the input Lab values are calculated in the interpolation mode, utilizing the following equation (7) and its expansion thereof (to be described with reference to FIG. 12) (interpolation mode). FIG. 12 is a diagram showing an example of determining inclusion in the CMY coordinate system. According to the example of determining inclusion in the CMY coordinate system, the CMY values ($q_{out}$) with respect to the input Lab values are calculated in the interpolation mode, assuming that the CMY value at the arithmetic processing reference point in the CMY coordinate system is q4 and the CMY values at the lattice points are q5, q6 and q7.

For the CMY values of the CMY→Lab3D-LUT, assume that the CMY value at the target of arithmetic processing is $q_{out}$, the CMY values set on the surface of this 3D-LUT are q5, q6 and q7, the CMY value at the addresses of each lattice set on the arithmetic processing reference point is q4, and the weighting factors in the CMY coordinate system are $Y_0$, $Y_1$ and $Y_2$. Based on this assumption the $q_{out}$ can be obtained from the following Eq. (7):

[Eq. 4]

$$qput = \begin{bmatrix} q5 - q4 \\ q6 - q4 \\ q7 - q4 \end{bmatrix} \cdot (Y_0 \quad Y_1 \quad Y_2) + q4 \quad (7)$$

This equation is expanded as follows:

$q_{out\_C} = (q5\_C - q4\_C) \times Y_0 + (q6\_C - q4\_C) \times Y_1 + (q7\_C - q4\_C) \times Y_2 + q4\_C$ $q_{out\_M} = (q5\_M - q4\_M) \times Y_0 + (q6\_M - q4\_M) \times Y_1 + (q7\_M - q4\_M) \times Y_2 + q4\_M$ $q_{out\_Y} = (q5\_Y - q4\_Y) \times Y_0 + (q6\_Y - q4\_Y) \times Y_1 + (q7\_Y - q4\_Y) \times Y_2 + q4\_Y$ It is also possible to solve the Eqs. (6) and (7) in advance and to store them in the ROM of the image processing section 76.

After that, the system goes to Step A8. A decision step is taken to determine if calculation of the CMY values with respect to the preset (inputted) Lab values has been completed or not. It has not been completed, the system goes back to the Step A4 so that the aforementioned processing is repeated. Upon completion of the calculation of the CMY values for all the input Lab values, the RGB→CMY3D-LUT is created.

The system goes to Step A9. Then the RGB→CMY3D-LUT is changed into the RGB→CMYK3D-LUT by the CGR (processing prior to ROM writing). In this example, the CMY values of the RGB→CMY3D-LUT created previously are converted into the CMYK values by the GCR algorithm. The mathematical equation for this conversion is the same as that described above, and will not be described to avoid duplication.

The aforementioned procedure creates the RGB→CMYK3D LUT. This RGB→CMYK3D-LUT is a color conversion table, wherein, when the RGB values outside the printer color gamut area that cannot be handled by the CMYK signal processing system 30 have been specified by the RGB signal processing system 20, the aforementioned RGB values are converted into the CMYK values of the upper or lower limit in the printer color gamut area that can be handled by the CMYK signal processing system 30.

Upon completion of the aforementioned processing, the system goes to Step A10. Then the ROM data Dout constituting the RGB→CMYK3D-LUT is written into the ROM 40. For example, the RAM of the control section 75 contains the ROM data Dout constituting the RGB→CMYK3D-LUT. It is transferred from the RAM to the ROM writer 77 so that it is written into the mask ROM and others. This arrangement creates the ROM 40 loaded with the RGB→CMYK3D-LUT.

Figure 13:
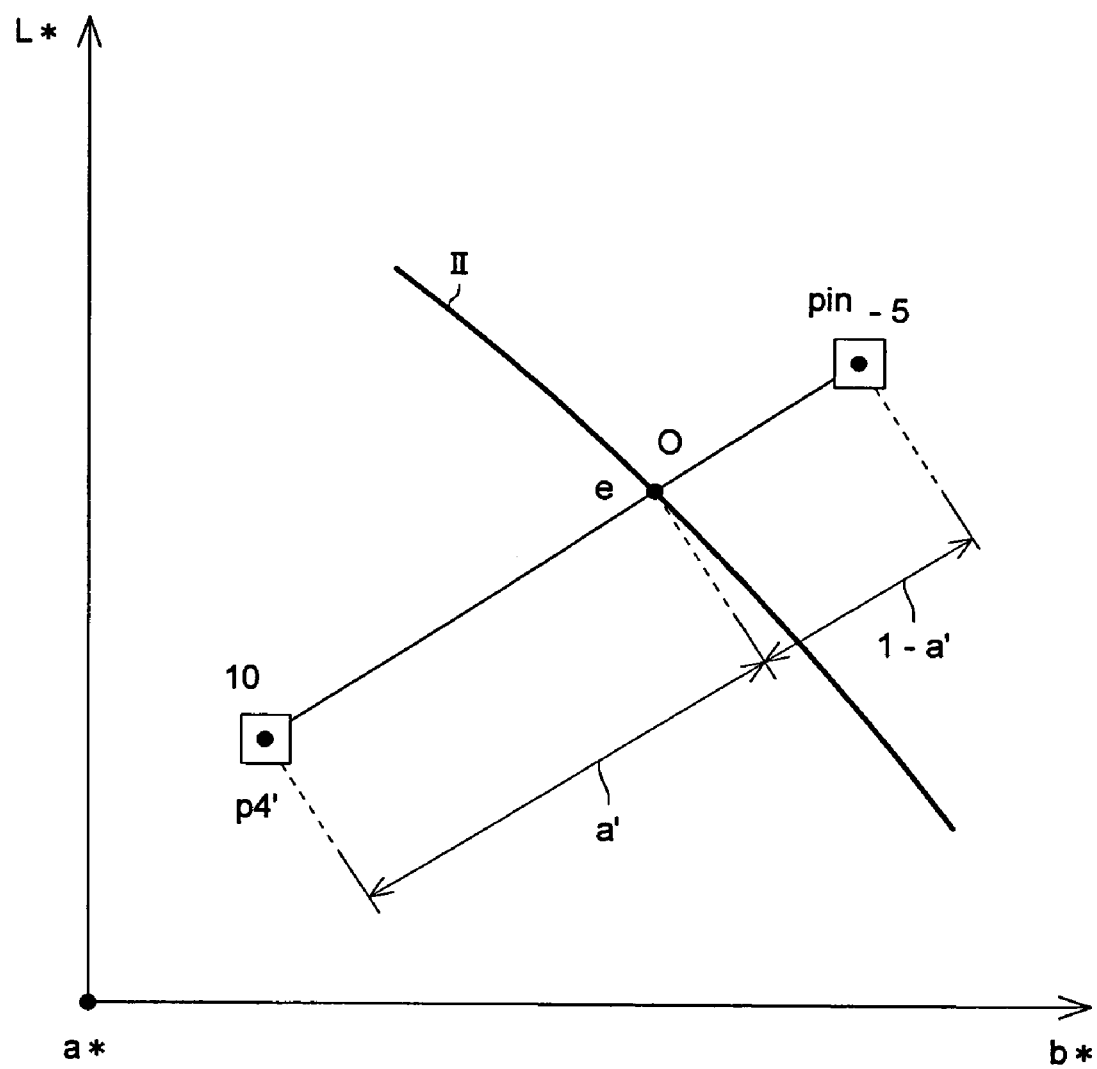
FIG. 13 is a color coordinate system diagrams showing an example of operation in the color conversion interpolator 50 to which the RGB→CMYK3D–LUT is applied.

The following describes an-example of the operation in the color conversion interpolator 50. FIG. 13 is a color coordinate system showing an example of operation in the color conversion interpolator 50.to which the RGB→CMYK3D-LUT is applied. The vertical axis in FIG. 13 represents a brightness L* axis. The horizontal axis represents a chromaticity b* axis. Chromaticity a* axis is found at the intersection between-the brightness L* axis and chromaticity b* axis. In FIG. 13, the curve (curved surface) indicates the printer color gamut boundary (surface). It is the color gamut boundary surface of the CMY→Lab3D-LUT expressed, for example, in 0 through 255 gradient value constituting the RGB→CMYK3D-LUT.

In this example, when the arithmetic processing reference point p4' and the RGB outside the printer color gamut area have been specified, the color conversion interpolator 50 calculates the weighting factor a' and weighting factor 1-a' wherein the CMY value at the arithmetic processing reference point p4' is "10", the CMY value at the target of arithmetic processing pin "-5", and the CMY value at point e subsequent to color conversion and interpolation is "0", for example. The point e subsequent to color conversion and interpolation denotes the portion (internally dividing point) intersecting the curve shown by in FIG. 13, when the arithmetic processing reference point p4' and target of arithmetic processing pin are connected by a straight line. For the CMY value="10" at the arithmetic processing reference point p4' and the CMY value="-5" at the target of arithmetic processing Pin, the 10 (N+α) bit CMYK value is read from the previously created RGB→CMYK3D-LUT. The color conversion interpolator 50 calculates the CMY value="0" at point e subsequent to color conversion and interpolation from the following Eq. (8), using a' and 1-a', wherein the weighting factor is a'=10/15:

$$0 = (1-a') \times 10 + a' \times (-5) \quad (8)$$

As described above, the color conversion interpolator 50 carries out the aforementioned arithmetic processing every time the color image signals R, G and B of the RGB signal processing system 20 outside the printer color gamut area, that cannot be handled by the CMYK signal processing system 30, have been designated, namely, every time the input value is converted by the RGB→CMYK3D-LUT into the value greater than the upper limit value in the printer color gamut area of the CMYK signal processing system 30, or smaller than the lower limit. Thus, all of these values are subjected to color conversion and interpolation to become the CMYK values of the upper limit (255) or lower limit value (0) inside the printer color gamut area that can be handled by the CMYK signal processing system 30.

As described above, according to the image processing apparatus and image processing method as the first embodiment, when the color image signals, R, G and B of the 8-bit RGB signal processing system 20 are converted into the 8-bit color image signals C, M, Y and K of the CMYK signal processing system 30, the ROM 40 is loaded with the RGB→CMYK3D–LUT as a 10-bit CMYK-value table, containing:

the CMYK values of 0 through 255 gradient value in the printer color gamut that can be handled by the CMYK signal processing system 30; and the CMYK values of less than 0 and more than 256 gradient value outside the printer color gamut area, with respect to the RGB values of the color image signals of the RGB signal processing system 20 created in advance. Based in the aforementioned arrangement, the color conversion interpolator 50 applies the processing of color conversion, based on the 10-bit CMYK values of the RGB→CMYK3D–LUT at the time of color conversion, so that the color image signals R, G and B of the RGB signal processing system 20 is changed into the 8-bit color image signals C, M, Y and K of the CMYK signal processing system 30.

Accordingly, when the RGB values outside the printer color gamut area that cannot be handled by the CMYK signal processing system 30 have been specified by the RGB signal processing system 20, the RGB values outside the printer color gamut area are color-converted into the CMYK values of the upper or lower limit in the printer color gamut area that can be handled by the CMYK signal processing system 30.

This arrangement allows a color image to be formed based on the CMYK values inside the printer color gamut area in the gradation ranging from 0 through 255, even when the color image signals R, G and B inside the printer color gamut area that can be handled by the CMYK signal processing system 30 have been specified from the RGB signal processing system 20, or when the color image signals R, G and B outside the printer color gamut area that cannot be handled by the CMYK signal processing system 30. Further, this can reduce color difference and color mixing in the color gamut area handled by the CMYK signal processing system 30 compare to the conventional system.

Embodiment 2

Figure 14:
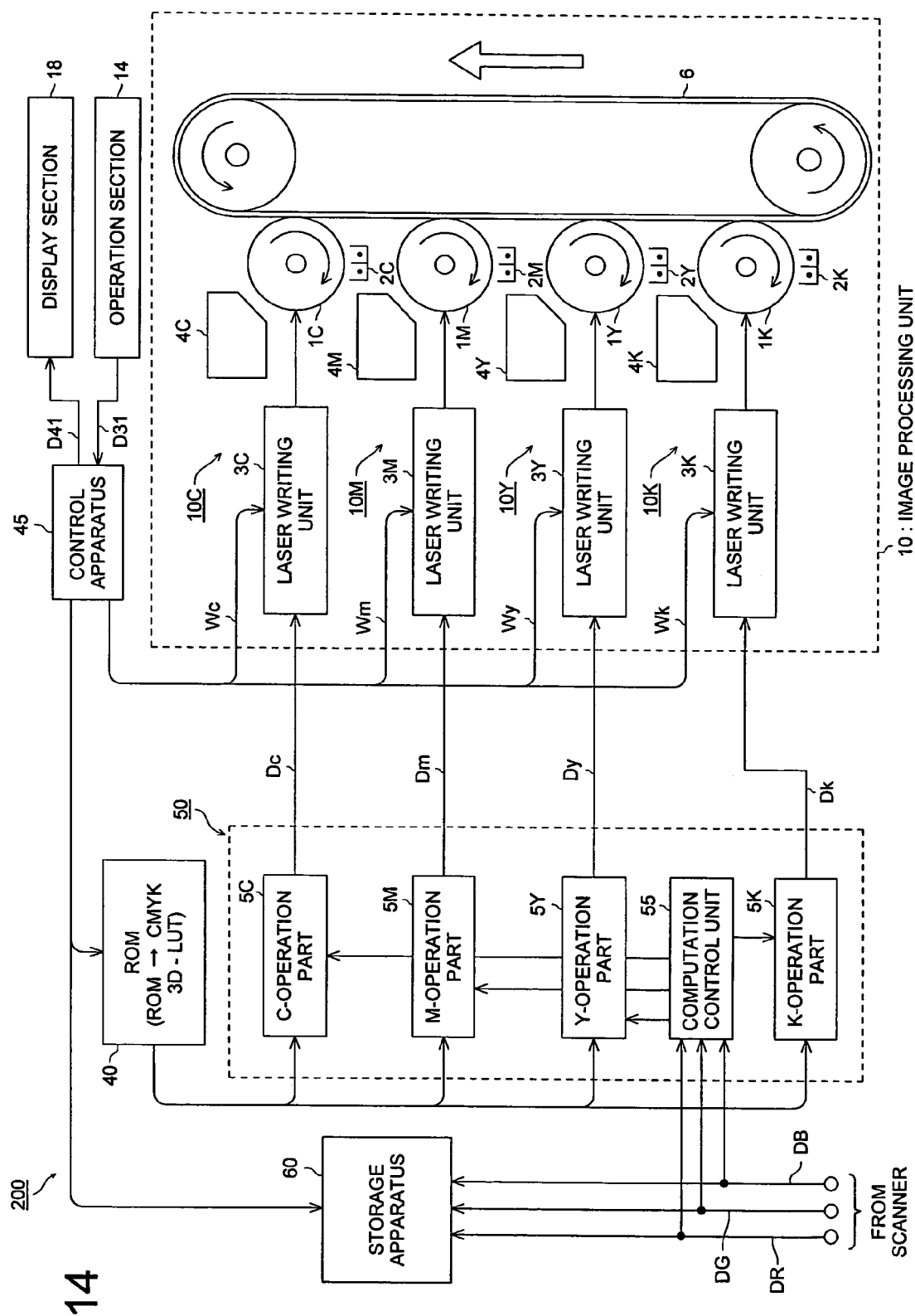
FIG. 14 is a block diagram representing an example of the structure of the color printer 200 as a second embodiment of the present invention.

FIG. 14 is a block diagram representing an example of the structure of the color printer 200 as a second embodiment of the present invention.

In this example, the printer 200 is provided with an image processing apparatus that allows the color image signals of the RGB signal processing system to be color-converted into the color image signals of the CMYK signal processing system. The ROM 40 loaded with the RGB→CMYK3D–LUT is used in the form of a recording medium.

The printer 200 shown in FIG. 14 constitutes an example of the image processing apparatus. It forms a color image, based on the color image signals in the CMYK signal processing system (for C, M, Y and K colors) as the output system obtained by color-conversion of the 24 (8×3) bit color image signals of the RGB signal processing system (for Red, Green and Blue colors) as the input system.

The printer 200 contains an image processing section 10, an operation section 14, a display section 18, a ROM 40, a control apparatus 45, a color conversion interpolator 50 and a storage apparatus 60. The control apparatus 45 is connected with the operation section 14 that is operated to input the printer operation conditions such as type of color (color/monochromatic) and the number of sheets to be copied. The data set on the operation section 14 is outputted to the control apparatus 45, in the form of operation data D31. The control apparatus 45 is connected with the display section 18, in addition to the operation section 14. The display section 18 displays the printer operation conditions and others based on the display data D41.

The control apparatus 45 is connected with the storage apparatus 60, which temporarily stores the color image (input) data DR, DG and DB of the RGB signal processing system inputted from the scanner and others. The storage apparatus 60 is loaded with the three-dimensional color information conversion table created by the image processing apparatus and image processing method of the present invention. It is connected with the color conversion interpolator 50.

The color conversion interpolator 50 reads the 24-bit image data DR, DG and DB of the RGB signal processing system read from the storage apparatus 60 at the time of color conversion. It is operated in such a way that the image data DR, DG and DB is color-converted into the 8-bit image data Dc, Dm, Dy and Dk of the CMYK signal processing system, based on the CMYK signal values read from the ROM 40. The color conversion interpolator 50 contains a C-operation part 5C, a M-operation part 5M, a Y-operation part 5Y, a K-operation part 5K, and a computation control unit 55, for example.

In this example, the RGB→CMYK3D–LUT is applied to each of the operation parts of the CMYK. Each operation part operates in such a way that the color image data DR, DG and DB of the RGB signal processing system will be color-converted into the image data Dc, Dm, Dy and Dk of the CMYK signal processing system. In this example, all image data DR, DG and DB of the RGB signal processing system outside the printer color gamut that cannot be handled by the CMYK signal processing system is subjected to color conversion and interpolation to become the CMYK values of the upper or lower limit inside the printer color gamut area that can be handled by the CMYK signal processing system.

The color conversion interpolator 50 is connected with the ROM 40 as an example of the recording medium. The ROM 40 is loaded with the RGB→CMYK3D–LUT. The RGB→CMYK3D–LUT is a color conversion-table capable of reading the 10-bit CMYK values containing:

the CMYK values of 0 through 255 gradient value in the printer color gamut area for color conversion from the 24-bit image data DR, DG and DB of the RGB signal processing system into the 8-bit image data Dc, Dm, Dy and Dk of the CMYK signal processing system; and the CMYK values of less than 0 and more than 256 gradient value outside the printer color gamut area.

In this example, the stored value of the RGB→CMYK3D–LUT represents a value greater than the number of the bits of the image data Dc, Dm, Dy and Dk of the CMYK signal processing system. For example, in the case of the RGB (8 bits in 0 through 255 gradient value)→CMYK (8 bits in 0 through 255 gradient value) 3D-LUT, the CMYK stored value represents 10 bits (-256 through 511 gradient value).

The ROM 40 allows color conversion from the color image data DR, DG and DB of the RGB signal processing system into the image data Dc, Dm, Dy and Dk of the CMYK signal processing system, utilizing the RGB→CMYK3D–LUT, and ensures excellent reproducibility of the results of conversion.

It also reduces the color difference around the color gamut that can be handled by the CMYK signal processing system. Moreover, color mixing is reduced as compared to the conventional compression interpolation function.

The color conversion interpolator 50 is connected with the image processing section (image processing means) 10, in addition to the ROM 40. The image processing section 10 forms a color image, based on the image data Dc, Dm, Dy and Dk of the CMYK signal processing system color-converted by the color conversion interpolator 50. The image processing section 10 includes an intermediate transfer belt 6, and image processing units 10C, 10M, 10Y and 10K. The image processing unit 10C contains a photoconductor drum 1C, a charger 2C, a laser writing unit 3C and a developer 4C. It allows the image data Dc to be written to the photoconductor drum 1C, based on the image write signal Wc.

The image forming unit 10M contains a photoconductor drum 1M, a charger 2M, a laser writing unit 3M and a developer 4M. It allows the image data Dm to be written to the photoconductor drum 1M, based on the image write signal Wm. The image forming unit 10Y contains a photoconductor drum 1Y, a charger 2Y, a laser writing unit 3Y and a developer 4Y. It allows the image data Dy to be written to the photoconductor drum 1Y, based on the image write signal Wy. The image forming unit 10K contains a photoconductor drum 1K, a charger 2K, a laser writing unit 3K and a developer 4K. It allows the image data Dk to be written to the photoconductor drum 1K, based on the image write signal Wk.

Figure 15:
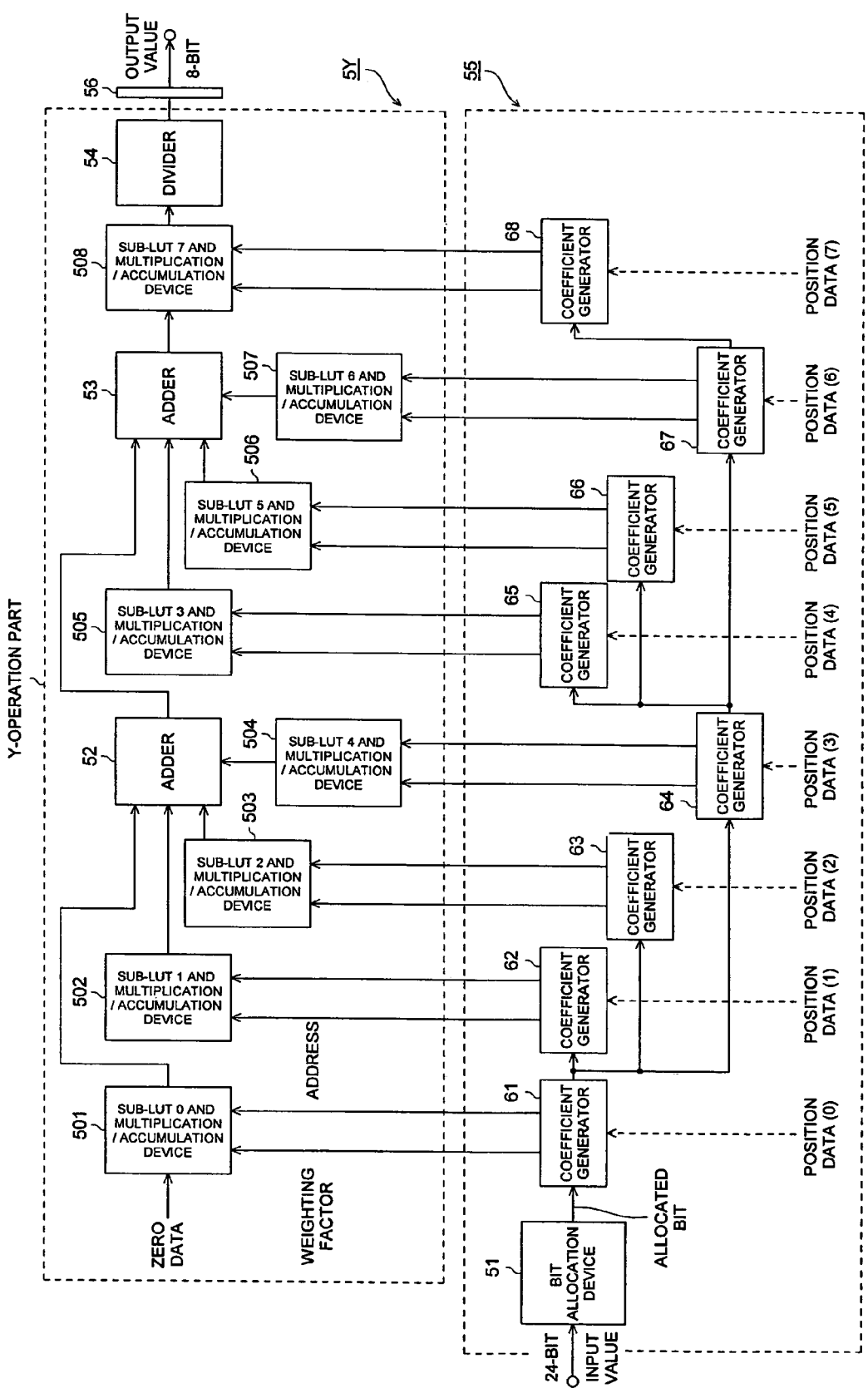
FIG. 15 is a block diagram showing an example of the internal structure of the Y-operation part 5Y and computation control unit 55.

FIG. 15 is a block diagram showing an example of the internal structure of the Y-operation part 5Y and computation control unit 55. The color conversion interpolator 50 shown in FIG. 15 contains a Y-operation part 5Y, a computation control unit 55 and a discarding device 56. It operates based on the principle of the "color interpolation method and color interpolation apparatus" disclosed in the Official Gazette of Japanese Patent Tokkai 2002-344757 as a Patent Document.

The computation control unit 55 is composed of a bit allocation device 51 eight coefficient generators 61 through 68. The bit allocation device 51 is connected to the storage apparatus 60 shown in FIG. 13, and allocates the bits in response to the image data DR, DG and DB of the RGB signal processing system (8 bits for each of R, G and B with a total of 24 bits; hereinafter referred to as "input data").

The bit allocation device 51 is connected with the coefficient generator 61. The position data (0) and the output of the bit allocation device 51 are inputted into the coefficient generator 61, and the weight and address are outputted. The coefficient generator 61 is connected with the coefficient generators 62 through 64. The position data (1) and the output of the coefficient generator 61 are inputted into the coefficient generator 62, and the weight and address are outputted. The position data (2) and the output of the coefficient generator 61 are inputted into the coefficient generator 63, and the weight and address are outputted. The position data (3) and the output of the coefficient generator 61 are inputted into the coefficient generator 64, and the weight and address are outputted.

The coefficient generator 64 is connected with the coefficient generators 65 through 67. The position data (4) and the output of the coefficient generator 64 are inputted into the coefficient generator 65, and the weight and address are outputted. The position data (5) and the output of the coefficient generator 64 are inputted into the coefficient generator 66, and the weight and address are outputted. The position data (6) and the output of the coefficient generator 64 are inputted into the coefficient generator 67, and the weight and address are outputted. The coefficient generator 67 is connected with the coefficient generator 68. The position data (7) and the output of the coefficient generator. 67 are inputted into the coefficient generator 68, and the weight and address are outputted.

The computation control unit 55 is connected with the Y-operation part 5Y. The Y-operation part 5Y includes two adders 52 and 53, one divider 54. The Y-operation part 5Y has two adders 52 and 53, one divider and eight computing units. The coefficient generator 61 is connected with the sub-LUT 0 and the computing unit 501 provided with a multiplication/accumulation function, and outputs the multiplication/accumulation data based on the zero data, weight and address. The coefficient generator 62 is connected with the sub-LUT 1 and the computing unit 502 provided with a multiplication/accumulation function, and outputs the multiplication/accumulation data based on the weight and address. The coefficient generator 63 is connected with the sub-LUT 2 and the computing unit 503 provided with a multiplication/accumulation function, and outputs the multiplication/accumulation data based on the weight and address. The coefficient generator 64 is connected with the sub-LUT 2 and the computing unit 504 provided with a multiplication/accumulation function, and outputs the multiplication/accumulation data based on the weight and address. The computing units 501 through 504 are connected with the adder 52, which adds four pieces of multiplication/accumulation data and outputs the added data.

The coefficient generator 65 is connected with a computing unit 505 having a sub-LUT 3 and a multiplication/accumulation function, and outputs multiplication/accumulation data, according to the weight and address. The coefficient generator 66 is connected with a computing unit 506 having a sub-LUT 5 and a multiplication/accumulation function, and outputs multiplication/accumulation data, according to the weight and address. The coefficient generator 67 is connected with a computing unit 507 having a sub-LUT 6 and a multiplication/accumulation function, and outputs multiplication/accumulation data, according to the weight and address.

The adder 52 and three computing units 505 through 507 are connected to the adder 53. It adds up the addition data and three pieces of multiplication/accumulation data, and outputs the addition data. The adder 53 is connected with a computing unit 508 having a sub-LUT 7 and a multiplication/accumulation function. The computing unit 508 is connected with the coefficient generator 68. The computing unit 508 outputs multiplication/accumulation data, according to the weight and address outputted from the coefficient generator 68, and the addition data outputted from the adder 53.

The RGB→CMYK3D–LUT read out from the ROM 40 is stored (copied) in the aforementioned eight sub-LUT 0 through 8. In this example, the sub-LUT 0 through 7 is loaded with the gradation value in the range including the value of 0 or less and 255 and more, for example, the gradation value of –256 through –511—not in the range from 0 through 255 gradient value. The multiplication/accumulation data is obtained adding the following two pieces of data using the adder;

the multiplication data obtained by multiplication of the LUT data outputted by the address for the sub-LUT n (n=0 through 7) by the weighting factor from each of the coefficient generators 61 through 68 using a multiplier; and the data received from the preceding step.

The aforementioned multiplication/accumulation data is fed to the next step by each of the computing units 501 through 507.

The computing unit 508 is connected with the divider 54. The multiplication/accumulation data (cumulative data) is divided by the sum total of the weighting factor., and the result is outputted in the form of 8-bit image data Dc, Dm, Dy and Dk. The divider 54 can be created by logic, or can be formed into a LUT. The range of arithmetic processing in the divider 54 is from 0 to 255 gradient value if the range assumed by the storage values of the sub-LUT. (3D-LUT) of the computing units 501 through 507 is from 0 to 255 gradient value; and is from—256 through 511 if the range assumed by the storage values is from—256 through 511. Because of this arrangement, image data Dc, Dm, Dy and Dk to be fed to the printer (output device) can be kept within 8 bits.

The divider 54 is connected with a discarding device 56. The output data of 8 bits or less is discarded by the discarding device 56. For example, the result outputted from the divider 54=0 gradient value or less is discarded to get "0", and 255 gradient value or more are discarded to get "255". This arrangement allows the output 8-bit image data Dy to be outputted. The divider 54 is composed of the these eight adders 501.through 508, two adders 52 and 53, one divider 54 and one discarding device 56. The number of the operation parts of this structure is "n" for each color. Thus, the image data Dc, Dm, Dy and Dk is supplied to the image processing section 10 (output device).

Figure 16:
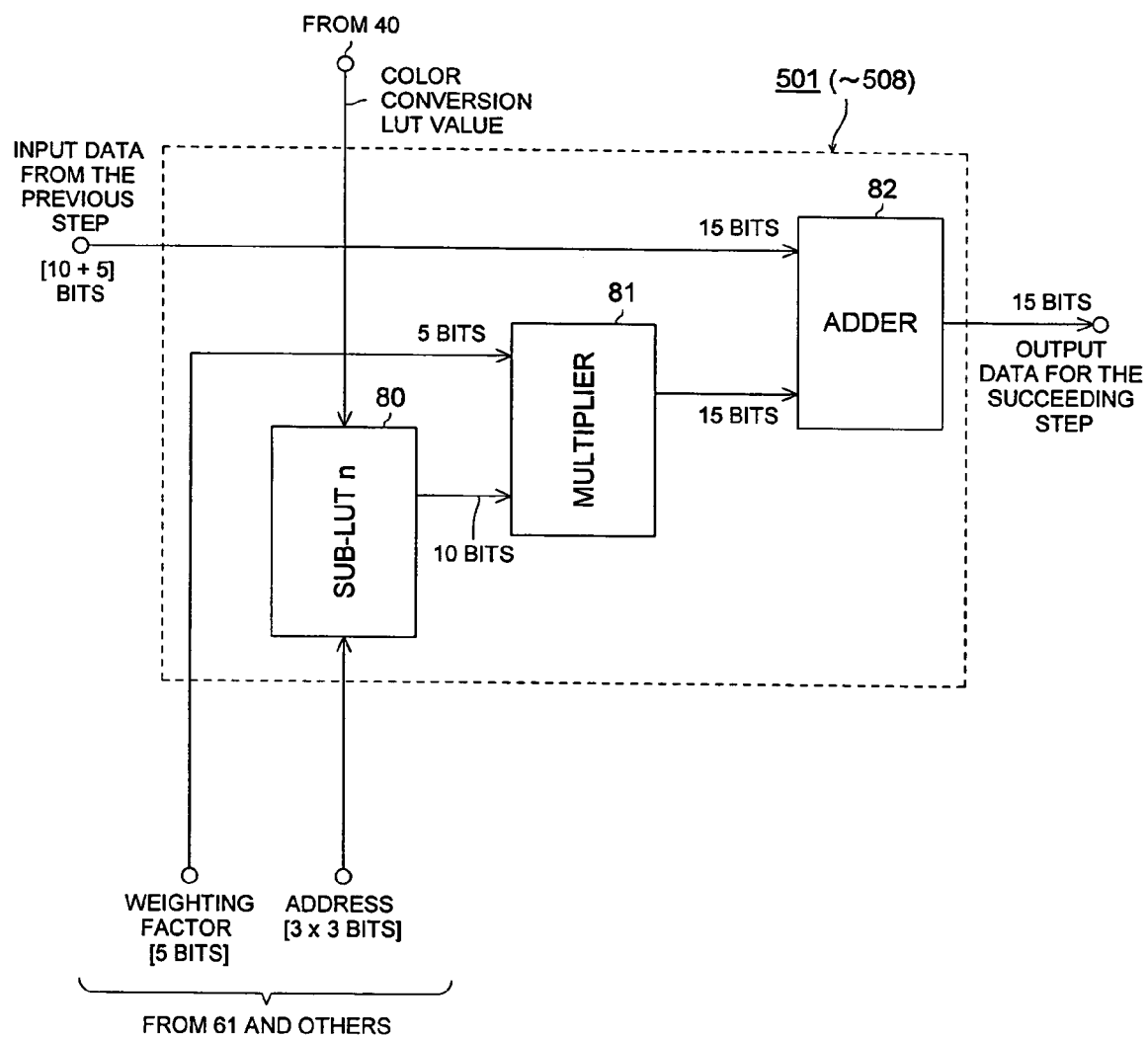
FIG. 16 is a block diagram showing an example of the internal structure of the computing unit 501 (through 508) having a sub-LUT n and a multiplication/accumulation function.

FIG. 16 is a block diagram showing an example of the internal structure of the computing unit having a sub-LUT n and a multiplication/accumulation function. The computing unit 501 shown in FIG. 16 includes a sub-LUT n 80, a multiplier 81 and an adder 82.

The sub-LUT n 80 is loaded with the RGB→CMYK3D-LUT (color conversion LUT value) read from the ROM 40. The sub-LUT n 80 inputs a 3×3-bit address and outputs the data corresponding to this input address, for example, 10-bit LUT data.

The sub-LUT n 80 is connected with the multiplier 81. It inputs the 5-bit weighting factor, for example, from the coefficient generator 61 and others. It also inputs the 10-bit output data from the sub-LUT n 80, performs multiplication, and outputs 15 (5+10)-bit multiplication data.

The multiplier 81 is connected with the adder 82. It adds the 15 (10+5)-bit data from the preceding step to the 15-bit multiplication data from the multiplier 81, and outputs the 15-bit multiplication/accumulation data to the next step. Then the output of the adder 82 (15 bits) is outputted to the computing unit 501 of this step. Here the output of the sub-LUT n, that of the multiplier 81 and that of the adder 82 are configured to form a latch structure. Since the data is shifted from left to right by the sync clock, a high-speed operation is performed.

The following describes an example of the operation of the color conversion interpolator 50. For example, assume the case where the scanner color gamut and printer color gamut are different as shown in FIG. 2, and the scanner color gamut is wider than the printer color gamut. According to this example, even in the aforementioned case, the input RGB values at the target of arithmetic processing outside the printer color gamut area can be interpolated to the upper or lower limit value inside the printer color gamut area.

In this example, when the image data DR, DG and DB of the RGB signal processing system is color-converted into the 8-bit image data Dc, Dm, Dy and Dk of the CMYK signal processing system, the ROM 40 is loaded with the RGB→CMYK3D-LUT capable of reading the 10-bit CMYK values containing:

the CMYK values of 0 through 255 gradient value in the printer color gamut area for color conversion from the 24-bit image data DR, DG and DBq of the RGB signal processing system created in the first embodiments into the 8-bit image data Dc, Dm, Dy and Dk of the CMYK signal processing system; and the CMYK values of less than 0 and more than 256 gradations outside the printer color gamut area.

Based on the above arrangement, the color conversion interpolator 50 color-converts the image data DR, DG and DB of the RGB signal processing system into the image data Dc, Dm, Dy and Dk of the CMYK signal processing system, according to the RGB→CMYK3D-LUT processed by the image processing apparatus 100 and/or image processing method of the present invention.

For example, the weighting factor (5 bits) and address (3×3) are inputted into the computing unit 501 from the coefficient generator 61 and others. The address enters the sub-LUT 0 and 10-bit conversion data is outputted from this sub-LUT 0. The multiplier 81 multiplies the output from the sub-LUT 0 by the weighting factor (5 bits). The result of multiplication is added to the data coming from the previous step by the adder 82, and the output thereof (10+5 bits) are outputted to the computing unit 502. Such arithmetic processing is carried out in eight steps, whereby the multiplication/accumulation data (cumulative value) of the sum total of the weighting factor and the final value is calculated.

This multiplication/accumulation data is divided by the total sum of the weighting factor by the divider 54, and is finally outputted as the 8-bit image data Dc, Dm, Dy and Dk. In the case of 4-point interpolation, the total sum of the weighting factor at 16×16×16 lattice points becomes 17. The output data of 8 bits or less is discarded by the discarding device 56. This arrangement allows the output 8-bit image data Dc, Dm, Dy and Dk to be outputted to the image processing section 10. The image processing section 10 forms a color image, based on the 8-bit color image information of the CMYK signal processing system color-converted by the color conversion interpolator 50.

For example, the image processing unit 10C allows the electrostatic latent image to be written onto the photoconductor drum 1C by the C-color laser writing unit 3C, based on the C-color image data Dc. The electrostatic latent image of the photoconductor drum 1C is developed by the developing unit 4 and is turned into a C-color image. The same processing is applied in the image processing sections 10M, 10Y and 10K so that the electrostatic latent images are written onto the photoconductor drums 1M, 1Y and 1K. The electrostatic latent images written onto the photoconductor drums 1M, 1Y and 1K are developed by the developing units 4M, 4Y and 4K, and are turned into M-color, Y-color and BK-color toner images.

The Y, M, C and BK-color toner images on the photoconductor drums 1Y, 1M, 1C and 1K are sequentially transferred onto the intermediate transfer belt 6 rotated by the primary transfer rollers 7Y, 7M, 7C and 7K, so that a superimposed image (color image: color toner image) is formed. The color image is transferred to paper from the intermediate transfer belt 6.

As described above, in the printer 200 as a second embodiment, when an color image is to be formed based on the 8×3-bit image data DR, DG and DB of the RGB signal processing system, the 8×3-bit image data DR, DG and DB of the RGB signal processing system is inputted and the color image data DR, DG and DB is converted into the 8-bit image data Dc, Dm, Dy and Dk of the CMYK signal processing system. The color conversion interpolator 50 allows the 10-bit CMYK to be read from the ROM 40, wherein the 10-bit CMYK values contains:

the CMYK values of 0 through 255 gradient value in the printer color gamut area handled by the CMYK signal processing system; and the CMYK values of less than 0 and more than 256 gradient value outside the printer color gamut area, with respect to the RGB values of the color image signals of the RGB signal processing system.

Based on the 10-bit CMY values read fro the ROM 40, the color conversion interpolator 50 color-changes the color image data DR, DG and DB of the RGB signal processing system into the 8-bit color image data Dc, Dm, Dy and Dk of the CMYK signal processing system.

Thus, the image data DR, DG and DB of the RGB signal processing system outside the printer color gamut area that cannot be handled by the CMYK signal processing system can be subjected to color conversion and interpolation to be changed into the image data Dc, Dm, Dy and Dk having the upper or lower limit value inside the printer color gamut area that can be handled by the CMYK signal processing system. Based on this arrangement, the image processing sectional forms a color image according to the color image data Dc, Dm, Dy and Dk of the CMYK signal processing system. Moreover, this arrangement reduces the color difference in the image data Dc, Dm, Dy and Dk of the CMYK signal processing system, and also decreases color mixing, as compared with a conventional printer having a compression interpolation function. Thus, the present invention provides a color image processing apparatus capable of forming a high-quality image, including a color copying machine, color printer and combination machine.

The present invention is preferably applied to a color printer, color copying machine and combination machine thereof, provided with a three-dimensional color conversion table.

The method of producing a color conversion table of the embodiments creates a color conversion table capable of minimizing the color difference in the color gamut and color mixture.

Also, the image processing apparatus and image processing method of the embodiments reduces the color difference around the color gamut handled by an output system, as compared with the conventional method. Further, all the color image signals outside the color gamut area that cannot be handled by the output system can be subjected to color-conversion and interpolation to become color image signals in the color gamut boundary handled by the output system. This arrangement allows the color mixing to be reduced, when compared to the conventional compression interpolation method.

The image forming apparatus of the embodiments reduces the color difference around the color gamut to be handled by the output system. Further, this image forming apparatus reduces color mixing, as compared to the image forming apparatus equipped with a conventional compression interpolation function. This arrangement provides an image forming apparatus capable of producing a high-quality color image.

The recording medium of the embodiments contributes not only to the reduction in the color difference around the color gamut handled by the output system, but also to the reduction in color mixing as compared to the conventional compression interpolation function.

What is claimed is:

1. A method for producing, using a table creating apparatus, a color conversion table by which a predetermined bit color image signal to be handled in an image input system for inputting an image is converted to a N bit color image signal to be handled in an image output system for outputting an image, N being a positive integer, the method comprising producing the color conversion table from which a N+bit color output value, with as a positive integer, exceeding a color gamut of the color image signal to be handled in the image output system can be read out corresponding to a color input value of the color image signal to be handled in the image input system, the color gamut having gradient values not less than 0 and not more than $2^N-1$.

2. The method of claim 1, wherein the N+α bit color output value includes a color output value less than 0 gradient value.

3. The method of claim 1, wherein the N+α bit color output value includes a color output value no less than $2^N$ gradient value.

4. The method of claim 1, wherein the producing of the color conversion table includes:
   detecting if a color input value of a color image signal of a computing object point exists within the color gamut of the color image signal to be handled in the image output system, and
   controlling for executing an interpolating process if the color input value of the color image signal of the computing object point exists within the color gamut of the color image signal to be handled in the image output system, or executing an extrapolating process if the color input value of the color image signal of the computing object point exists out of the color gamut of the color image signal to be handled in the image output system;
   wherein in the interpolating process, color output values of color image signals to be handled in the image output system are obtained, corresponding to color input values of color image signals of four vertexes surrounding the color input value of the computing object point expanded on a color solid coordinate system;
   wherein in the extrapolating process, a computing reference point is selected from the color image signals to be handled in the image input system, the color image signals being expanded on the color solid coordinate system, the computing reference point and a computing object point are connected with a straight line fixing the computing reference point, and color output values of color image signals to be handled in the image output system are obtained, corresponding to the color input value of the color image signal of the computing object point and the color input values of the color image signals of three vertexes surrounding the color input value of the color image signal of the computing object point; and
   wherein the extrapolating process comprises obtaining the color output value existing out of the color gamut of the color image signal to be handled in the image output system.

5. The method of claim 1, wherein a color-image signal to be handled in the image input system includes an image signal of red, green and blue, and a color image signal to be handled in the image output system includes an image signal of cyan, magenta, yellow and black.

6. An image processing apparatus which converts a predetermined bit color image signal to be handled in an image input system for inputting an image to a N bit color image signal, with N as a positive integer, to be handled in an image output system for outputting an image, the apparatus comprising:
   a memory section which stores a N+α bit color output value exceeding a color gamut of the color image signal to be handled in the image output system corresponding to a color input value to be handled in the image input system, the color gamut having gradient values not less than 0 and not more than $2^N-1$;

a processing section which reads out the color output value corresponding to the color input value from the memory section, and a color converting section which converts the N+α bit color output value to a N bit color image signal to be handled in the image output system.

7. The image processing apparatus of claim 6, wherein the N+α bit color output value includes a color output value which is less than 0 gradient value.

8. The image processing apparatus of claim 6, the N+α bit color output value includes a color output value which is no less than $2^N$ gradient value.

9. The image processing apparatus of claim 6, wherein the color converting section interpolates all of color output values out of the color gamut to be handled in the image output system to a color output value of an upper limit or a lower limit of the color gamut to be handled in the image output system.

10. The image processing apparatus of claim 9, wherein the color converting section interpolates a color output value less 0 gradient value which is read out by the processing section from the memory section to the color output value of the lower limit of the color gamut to be handled in the image output system.

11. The image processing apparatus of claim 9, wherein the color converting section interpolates a color output value more than $2^N$ gradient value which is read out by the processing section from the memory section to the color output value of the upper limit of the color gamut to be handled in the image output system.

12. The image processing apparatus of claim 6, wherein the color image signal to be handled in the image input system includes an image signal of red, green and blue, and the color image signal to be handled in the image output system includes an image signal of cyan, magenta, yellow and black.

13. An image forming apparatus which forms a color image comprised of cyan, magenta, yellow and black based on an inputted color image signal comprised of image signals of red, green and blue, comprising the image processing apparatus of claim 12.

14. An image processing method, which is performed by an image processing apparatus for converting a predetermined bit color image signal to be handled in an image input system for inputting an image to a N bit color image signal to be handled in an image output system for outputting an image, N being a positive integer, and the method comprising converting the predetermined bit color image signal to be handled in the image input system to the N bit color image signal to be handled in the image output system based on a N+alpha, bit color output value read out from a color conversion table from which the N+alpha, bit color output value exceeding a color gamut of the color image signal to be handled in the image output system can be read out corresponding to a color input value of the color image signal to be handled in the image input system the color gamut having gradient values not less than 0 and not more than 2N−1.

15. The image processing method of claim 14, wherein the N+α bit color output value includes a color output value which is less than 0 gradient value.

16. The image processing method of claim 14, wherein all color output values out of the color gamut to be handled in the image output system are interpolated to a color output value of an upper limit or a lower limit of the color gamut to be handled in the image output system.

17. The image processing method of claim 16, wherein a color output value less than 0 gradient value is interpolated to the color output value of the lower limit of the color gamut to be handled in the image output system.

18. The image processing method of claim 16, wherein a color output value more than $2^N$ gradient value is interpolated to the color output value of the upper limit of the color gamut to be handled in the image output system.

19. The image processing method of claim 16, wherein the color image signal to be handled in the image input system includes an image signal of red, green and blue, and the color image signal to be handled in the image output system includes an image signal of cyan, magenta, yellow and black.

20. The image processing method of claim 14, wherein the N+α bit color output value includes a color output value which is no less than $2^N$ gradient value.

21. A computer readable recording medium [having stored thereon] which stores a color conversion table used by an image processing apparatus for converting a predetermined bit color image signal to be handled in an image input system for inputting an image to a N bit color image signal, with N as a positive integer, to be handled in an image output system for outputting an image, the conversion table comprising; a N+alpha, bit color output value, with as a positive integer, exceeding a color gamut of a color image signal to be handled in the image output system corresponding to a color input value to be handled in the image input system, the color gamut having gradient values not less than 0 and not more than 2N−1, wherein the N+alpha, bit color output value can be read out of the color conversion table corresponding to the color input value.

* * * * *